(12) United States Patent
Shibata et al.

(10) Patent No.: US 12,555,974 B2
(45) Date of Patent: Feb. 17, 2026

(54) OPTICAL DEVICE

(71) Applicant: TDK CORPORATION, Tokyo (JP)

(72) Inventors: Tetsuya Shibata, Tokyo (JP); Hideaki Fukuzawa, Tokyo (JP); Tomohito Mizuno, Tokyo (JP); Masahiro Shinkai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 809 days.

(21) Appl. No.: 17/939,472

(22) Filed: Sep. 7, 2022

(65) Prior Publication Data

US 2023/0097100 A1    Mar. 30, 2023

(30) Foreign Application Priority Data

Sep. 27, 2021  (JP) ................. 2021-156524

(51) Int. Cl.
| | | |
|---|---|---|
| *H01S 3/10* | (2006.01) | |
| *H01S 5/00* | (2006.01) | |
| *H01S 5/02212* | (2021.01) | |
| *H01S 5/02325* | (2021.01) | |
| *H01S 5/0683* | (2006.01) | |
| *H01S 5/22* | (2006.01) | |
| *H01S 5/343* | (2006.01) | |
| *G01J 1/42* | (2006.01) | |

(52) U.S. Cl.
CPC ........ *H01S 5/0014* (2013.01); *H01S 5/02212* (2013.01); *H01S 5/02325* (2021.01); *H01S 5/0683* (2013.01); *H01S 5/22* (2013.01); *H01S 5/34333* (2013.01); *G01J 1/4257* (2013.01)

(58) Field of Classification Search
CPC .............. H01S 5/0014; H01S 5/02212; H01S 5/02325; H01S 5/0683; H01S 5/22; H01S 5/34333
See application file for complete search history.

(56) References Cited

U.S. PATENT DOCUMENTS

| | | |
|---|---|---|
| 6,920,161 B2 | 7/2005 | Riaziat et al. |
| 2004/0047021 A1 | 3/2004 | Sakane et al. |
| 2005/0189548 A1 | 9/2005 | Nagai et al. |
| 2005/0213882 A1 | 9/2005 | Go et al. |

FOREIGN PATENT DOCUMENTS

| | | |
|---|---|---|
| JP | H07-333233 A | 12/1995 |
| JP | H08-078703 A | 3/1996 |
| JP | H11-330387 A | 11/1999 |
| JP | 2005-010484 A | 1/2005 |
| JP | 2005-516404 A | 6/2005 |
| JP | 2005-210092 A | 8/2005 |
| JP | 2005-252251 A | 9/2005 |

OTHER PUBLICATIONS

Chen et al, "All-Optical Switching of Magnetic Tunnel Junctions with Single Subpicosecond Laser Pulses," Physical Review Applied, Feb. 28, 2017, pp. 021001-1 through 021001-6.

*Primary Examiner* — Kinam Park
(74) *Attorney, Agent, or Firm* — Oliff PLC

(57) ABSTRACT

The optical device includes a magnetic element including a first ferromagnetic layer, a second ferromagnetic layer, and a spacer layer sandwiched between the first ferromagnetic layer and the second ferromagnetic layer, and a laser diode. At least a part of light emitted from the laser diode is applied to the magnetic element.

20 Claims, 15 Drawing Sheets

OPTICAL DEVICE

BACKGROUND

The disclosure relates to an optical device. Priority is claimed on Japanese Patent Application No. 2021-156524, filed Sep. 27, 2021, the content of which is incorporated herein by reference.

Lasers are used in various fields. The laser is emitted, for example, from a laser diode. Laser diodes are packaged and commercially available. Each of a can package and a butterfly package is known as one of laser diode packages.

For example, Patent Document 1 discloses a structure in which a laser diode is accommodated in a can package. In the can package, a semiconductor photodiode is arranged as a photodetection element on a back surface of the laser diode and the semiconductor photodiode monitors light output from the laser diode.

Patent Documents

[Patent Document 1] Published Japanese Translation No. 2005-516404 of the PCT International Publication

SUMMARY

A semiconductor photodiode is widely used for a photoelectric conversion element. On the other hand, new breakthroughs are required for the further development of optical devices including photoelectric conversion elements.

It is desirable to provide a novel optical device.

The optical device including: a magnetic element including a first ferromagnetic layer, a second ferromagnetic layer, and a spacer layer sandwiched between the first ferromagnetic layer and the second ferromagnetic layer; and a laser diode, wherein at least a part of light emitted from the laser diode is applied to the magnetic element.

DETAILED DESCRIPTION

Figure 1:
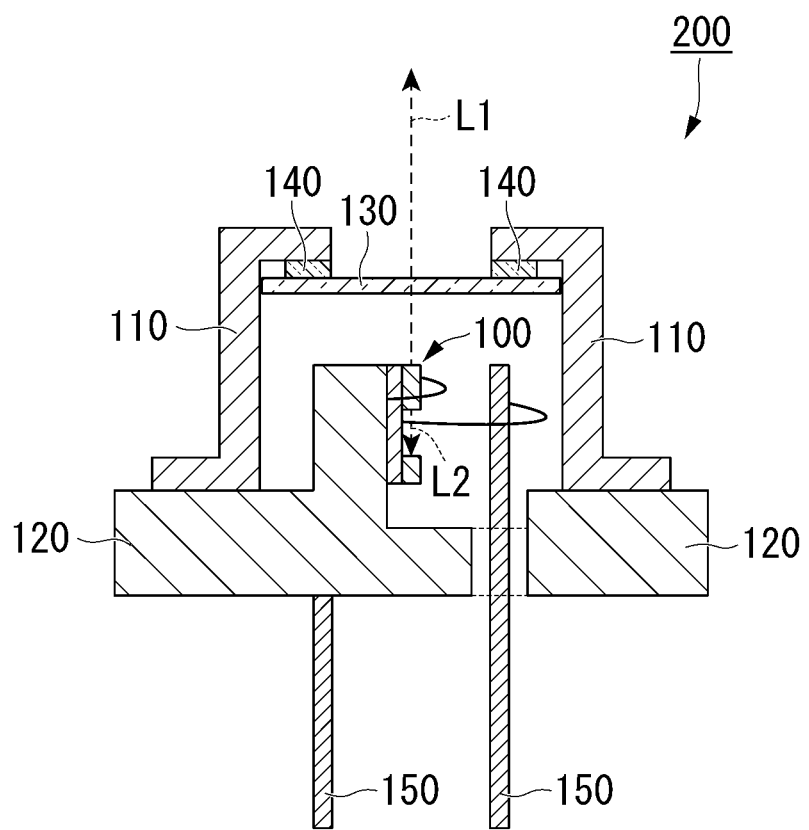
FIG. 1 is a cross-sectional view of a package including an optical device according to a first embodiment.

Hereinafter, embodiments will be described in detail with reference to the drawings as appropriate. In the drawings used in the following description, featured parts may be enlarged parts for convenience such that the features of the disclosure are easier to understand, and dimensional ratios and the like of the respective components may be different from actual ones. Materials, dimensions, and the like exemplified in the following description are examples, the disclosure is not limited thereto, and modifications can be appropriately made in a range in which advantageous effects of the disclosure are exhibited.

Directions will be defined. A direction in a plane on which a substrate 10 (see FIG. 2) spreads is defined as an x-direction and a direction in a plane orthogonal to the x-direction is defined as a y-direction. For example, a direction in which a laser diode 20 and a magnetic element 30 are connected is defined as the x-direction. A direction orthogonal to the substrate 10 (a direction orthogonal to the x-direction and the y-direction) is defined as a z-direction. Hereinafter, a +z-direction may be expressed as an "upward" direction and a −z-direction may be expressed as a "downward" direction. The upward and downward directions do not always coincide with a direction in which gravity is applied.

First Embodiment

FIG. 1 is a cross-sectional view of a package 200 including an optical device 100 according to the first embodiment. The package 200 shown in FIG. 1 is a can package. The package 200 is not limited to the can package, and may be, for example, a butterfly package.

The package 200 includes an optical device 100, a cap 110, a stem 120, a cover glass 130, an adhesive portion 140, and a lead 150. The optical device 100 is mounted on the stem 120 and surrounded by the cap 110. The cap 110 has an opening. The opening of the cap 110 is covered with the cover glass 130. The cover glass 130 is connected to the cap 110 via, for example, the adhesive portion 140. The adhesive portion 140 is, for example, low melting point glass. The lead 150 is responsible for an electrical connection with an external portion. The lead 150 is electrically connected to the optical device 100.

Figure 2:
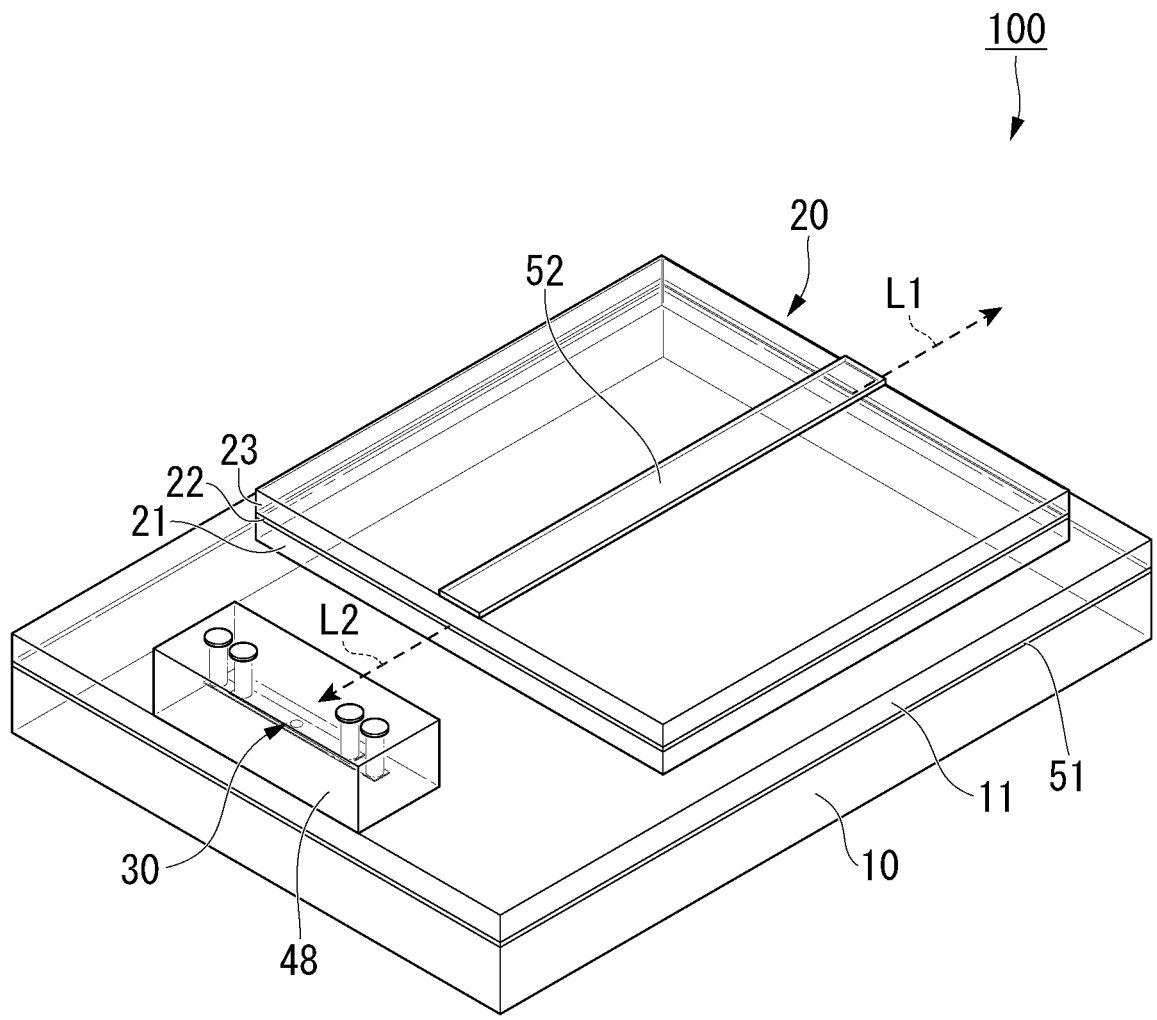
FIG. 2 is a perspective view of the optical device according to the first embodiment.
Figure 3:
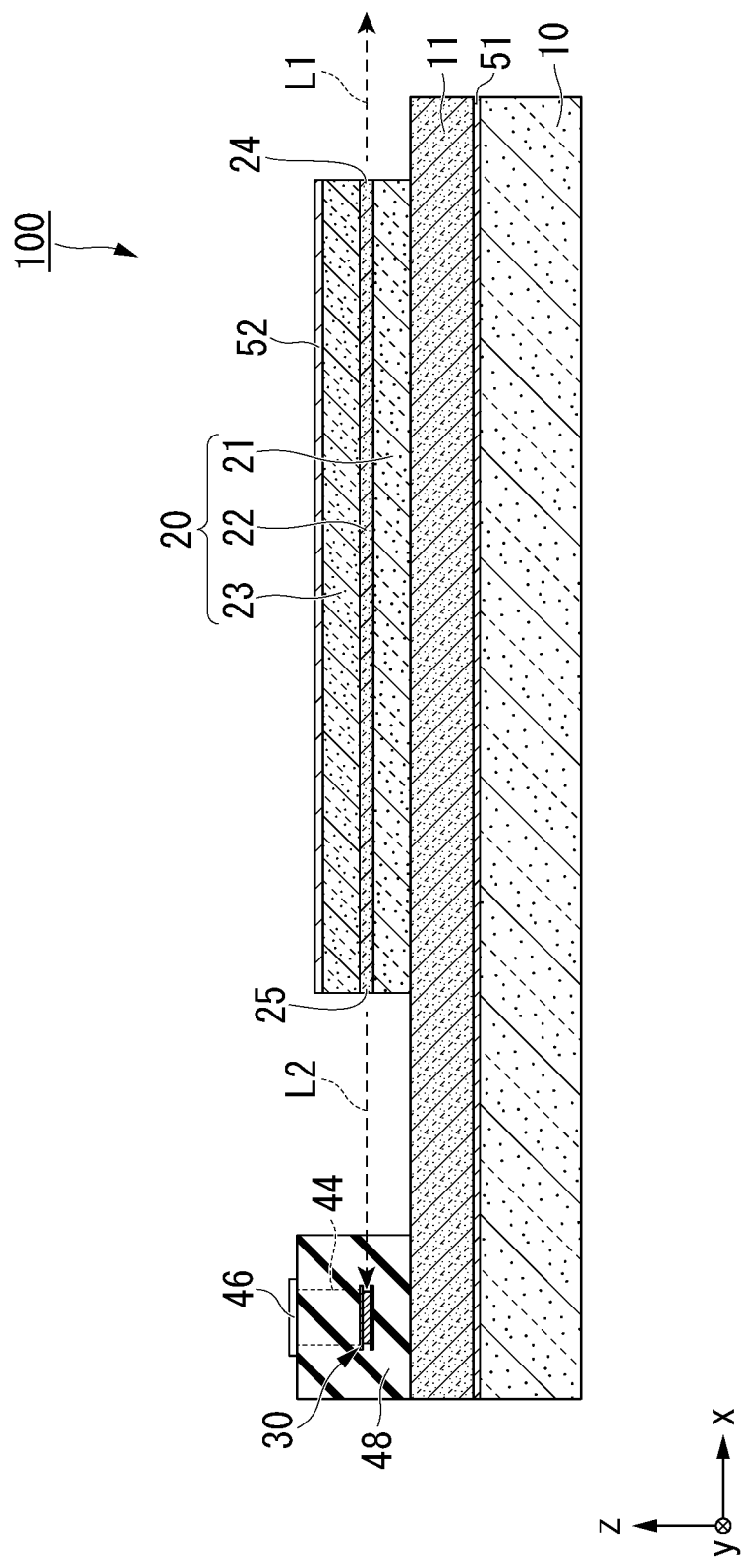
FIG. 3 is a cross-sectional view of the optical device according to the first embodiment.

FIG. 2 is a perspective view of the optical device 100 according to the first embodiment. FIG. 3 is a cross-sectional view of the optical device 100 according to the first embodiment. The optical device 100 includes the substrate 10, the laser diode 20, and the magnetic element 30. The laser diode 20 has a first emission portion 24 and a second emission portion 25, emits light L1 from the first emission portion 24, and emits light L2 from the second emission portion 25. At least a part of the light L1 and L2 (at least a part of the light L2) emitted from the laser diode 20 is applied to the magnetic element 30. The light L1 is externally emitted through, for example, the cover glass 130.

The substrate 10 is, for example, a semiconductor substrate, a sapphire substrate, or the like. The semiconductor substrate is, for example, a Si substrate, a GaN substrate, or a SiC substrate. The laser diode 20 and the magnetic element 30 are on the substrate 10 or above the substrate 10.

A buffer layer 11 may be provided on an upper surface of the substrate 10. The buffer layer 11 is, for example, an n-type semiconductor. The buffer layer 11 is, for example, an n-type GaN. The buffer layer 11 may be formed on the entire upper surface of the substrate 10 or may be located only at a position overlapping the laser diode 20.

The laser diode 20 has an n-type clad layer 21, an active layer 22, and a p-type clad layer 23. The active layer 22 is sandwiched between the n-type clad layer 21 and the p-type clad layer 23.

Known materials can be used for each of the n-type clad layer 21, the active layer 22, and the p-type clad layer 23. The n-type clad layer 21 is, for example, an n-type semiconductor. The n-type clad layer 21 is, for example, a laminated film of n-type AlGaN and GaN or n-type InP. The active layer 22 is, for example, an InGaN quantum well layer (MQW) or InGaAsP. The p-type clad layer 23 is, for example, a p-type semiconductor. The p-type clad layer 23 is, for example, a laminated film of p-type AlGaN and GaN or p-type InP.

The laser diode 20 can be manufactured in a known method. The laser diode 20 is manufactured, for example, according to a laminating step and a processing step for each layer. For example, the laser diode 20 is formed on the substrate 10 via the buffer layer 11 or the like according to a vacuum film forming process.

The laser diode 20 is sandwiched between the electrode 51 and the electrode 52. The electrode 51 is, for example, between the substrate 10 and the buffer layer 11. When a voltage is applied between the electrode 51 and the electrode 52, electrons from the n-type clad layer 21 flow into the active layer 22 and holes from the p-type clad layer 23 flow into the active layer 22. The laser diode 20 emits light when these electrons and holes are recombined in the active layer 22. The light is confined in the active layer 22, reciprocates while being amplified in the active layer 22, and is induced and emitted from the first emission portion 24 and the second emission portion 25. A part of the light L1 emitted from the first emission portion 24 is externally emitted. A part of the light L2 emitted from the second emission portion 25 is applied to the magnetic element 30. The first emission portion 24 and the second emission portion 25 are end portions of the active layer 22 in the x-direction.

The magnetic element 30 and the laser diode 20 are on the same substrate 10. The magnetic element 30 and the laser diode 20 are incorporated in one article. The laser diode 20 and the magnetic element 30 are on the substrate 10 or above the substrate 10.

The magnetic element 30 is at a position where at least a part of the light L1 and L2 (at least a part of the light L2) emitted from the laser diode 20 is applied. For example, a height position of the magnetic element 30 in the z-direction coincides with a height position of the second emission portion 25 in the z-direction. The magnetic element 30 is located, for example, in front of the second emission portion 25 of the laser diode 20 (in front of the traveling direction of the light L2 emitted from the second emission portion 25). At least a part of the light L1 and L2 (at least a part of the light L2) emitted from the laser diode 20 is applied to the magnetic element 30 from a direction intersecting the lamination direction of the magnetic element 30 (in the z-direction in FIG. 2).

The light L2 applied to the magnetic element 30 is not limited to visible rays, but may be infrared rays having a wavelength longer than that of visible rays or ultraviolet rays having a wavelength shorter than that of visible rays. The wavelength of visible rays is, for example, 380 nm or more and less than 800 nm. The wavelength of infrared rays is, for example, 800 nm or more and 1 mm or less. The wavelength of ultraviolet rays is, for example, 200 nm or more and less than 380 nm. The light L2 applied to the magnetic element 30 is, for example, light that includes a high-frequency optical signal and whose intensity changes. The high-frequency optical signal is, for example, a signal having a frequency of 100 MHz or more.

Figure 4:
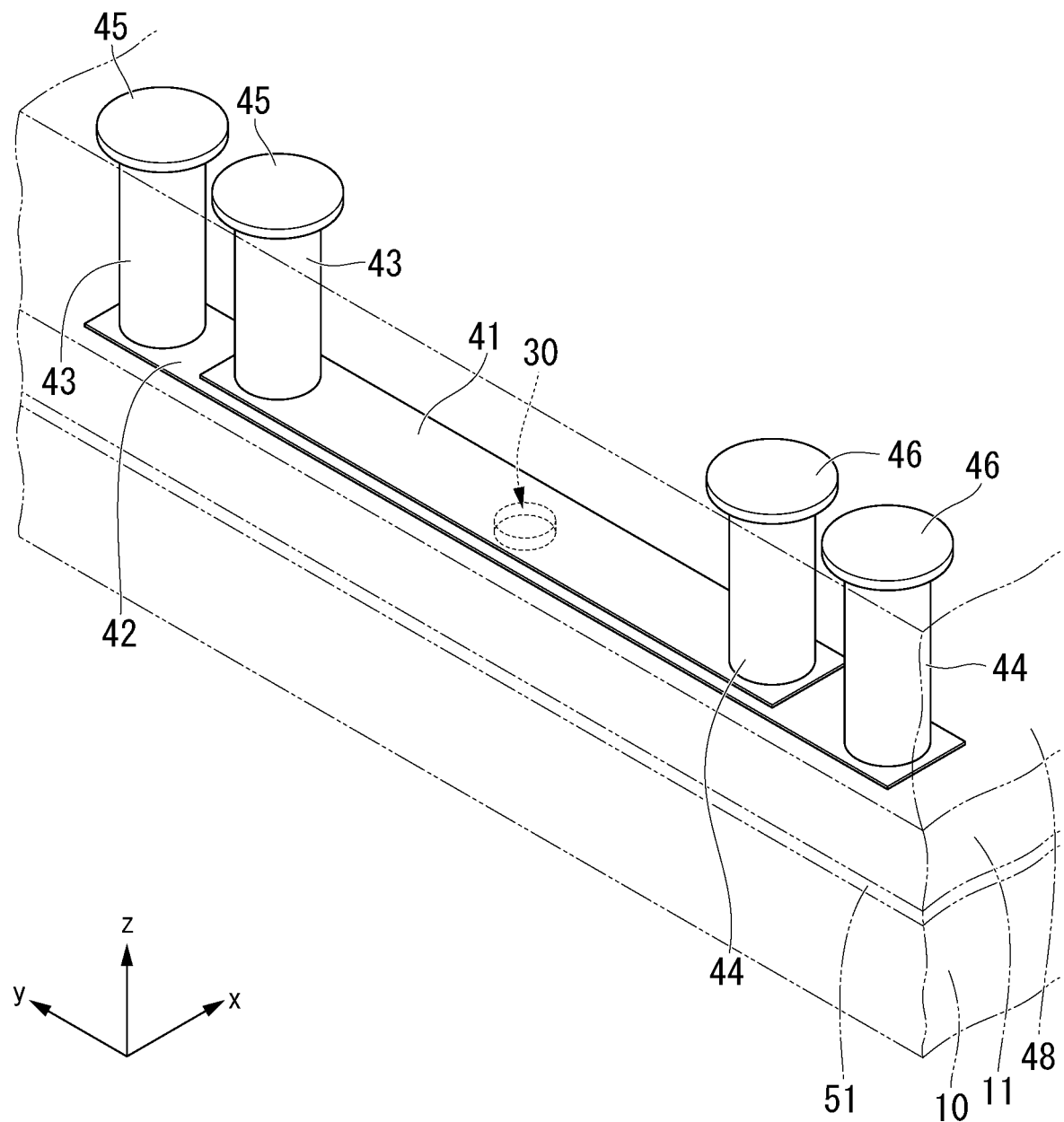
FIG. 4 is a perspective view of the vicinity of a magnetic element of the optical device according to the first embodiment.

FIG. 4 is a perspective view of the vicinity of the magnetic element 30 of the optical device 100 according to the first embodiment. The magnetic element 30 is electrically connected to, for example, electrodes 41 and 42, via wirings 43 and 44, a first terminal 45, and a second terminal 46. The periphery of the magnetic element 30 is covered with an insulating layer 48.

The electrode 41 is connected to a first surface of the magnetic element 30. The electrode 42 is connected to a second surface of the magnetic element 30. The first surface and the second surface face each other in the lamination direction of the magnetic element 30.

The electrodes 41 and 42 include a conductive material. The electrodes 41 and 42 include, for example, a metal such as Cu, Al, Au, or Ru. Ta and Ti may be laminated above and below these metals. Also, as the electrodes 41 and 42, a laminated film of Cu and Ta, a laminated film of Ta, Cu, and Ti, and a laminated film of Ta, Cu, and TaN may be used. Also, TiN or TaN may be used for the electrodes 41 and 42.

The electrodes 41 and 42 may have transparency in a wavelength range of the light applied to the magnetic element 30. For example, the electrodes 41 and 42 may be transparent electrodes containing a transparent electrode material such as an oxide such as indium tin oxide (ITO), indium zinc oxide (IZO), zinc oxide (ZnO), or indium gallium zinc oxide (IGZO). Also, the electrodes 41 and 42 may be configured to have a plurality of columnar metals in these transparent electrode materials.

The via wiring 43 connects the first terminal 45 to the electrode 41 or the electrode 42. There are, for example, two first terminals 45. A current or voltage is input to one of the first terminals 45 and the other of the first terminals 45 is connected to a reference potential. The first terminal 45 is exposed, for example, on the upper surface of the insulating layer 48.

The via wiring 44 connects the second terminal 46 to the electrode 41 or the electrode 42. There are, for example, two second terminals 46. A signal is output from one of the second terminals 46 and the other of the second terminals 46 is connected to the reference potential. The second terminal 46 is exposed, for example, on the upper surface of the insulating layer 48.

The via wirings 43 and 44, the first terminal 45, and the second terminal 46 include a conductive material. As the materials of the via wirings 43 and 44, the first terminal 45, and the second terminal 46, materials that are the same as those given as examples of the electrodes 41 and 42 can be used.

The insulating layer 48 is an interlayer insulating layer. The insulating layer 48 is, for example, an oxide, a nitride, or an oxynitride of Si, Al, or Mg. The insulating layer 48 is, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

When the state of the light L2 applied to the magnetic element 30 changes, a voltage output from the magnetic element 30 (a potential difference between the electrode 41 and the electrode 42) changes in accordance with a change in the state of the light L2.

Figure 5:
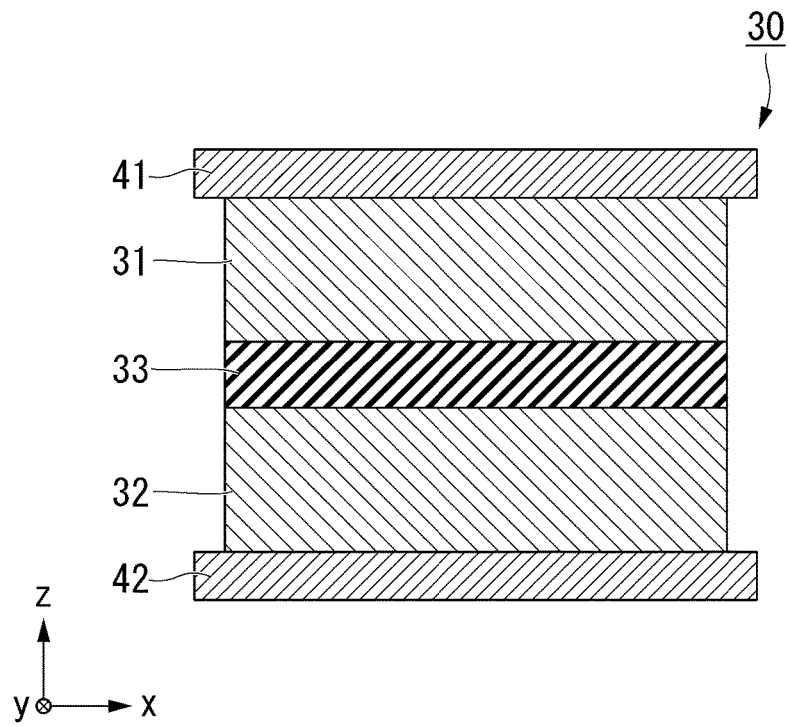
FIG. 5 is a cross-sectional view of the magnetic element according to the first embodiment.

FIG. 5 is a cross-sectional view of the magnetic element 30 according to the first embodiment. The magnetic element 30 has, for example, a first ferromagnetic layer 31, a second ferromagnetic layer 32, and a spacer layer 33. The first ferromagnetic layer 31 is connected to the electrode 41 and the second ferromagnetic layer 32 is connected to the electrode 42. The spacer layer 33 is located between the first ferromagnetic layer 31 and the second ferromagnetic layer 32. The magnetic element 30 may have another layer in addition to these. For example, light L2 from the x-direction is applied to the magnetic element 30.

The magnetic element 30 is, for example, a magnetic tunnel junction (MTJ) element in which the spacer layer 33 contains an insulating material. In this case, the magnetic element 30 is an element in which a resistance value in the lamination direction (a resistance value when a current flows in the lamination direction) changes in accordance with a relative change between the magnetization state of the first ferromagnetic layer 31 and the magnetization state of the second ferromagnetic layer 32. Such an element is also referred to as a magnetoresistance effect element.

The first ferromagnetic layer 31 is a photodetection layer whose magnetization state changes when external light is applied. The first ferromagnetic layer 31 is also referred to as a magnetization free layer. The magnetization free layer is a layer containing a magnetic material whose magnetization state changes when prescribed external energy is applied. The prescribed external energy is, for example, externally applied light, a current flowing in the lamination direction of the magnetic element 30, and an external magnetic field. A state of the magnetization of the first ferromagnetic layer 31 changes in accordance with the intensity of the light L2 applied to the first ferromagnetic layer 31.

The first ferromagnetic layer 31 contains a ferromagnet. In the present specification, ferromagnetism includes ferrimagnetism. The first ferromagnetic layer 31 contains at least one of magnetic elements such as, for example, Co, Fe, or Ni. The first ferromagnetic layer 31 may contain non-magnetic elements such as B, Mg, Hf, and Gd in addition to the magnetic elements as described above. The first ferromagnetic layer 31 may be, for example, an alloy containing a magnetic element and a non-magnetic element. The first ferromagnetic layer 31 may be composed of a plurality of layers. The first ferromagnetic layer 31 is, for example, a CoFeB alloy, a laminate in which a CoFeB alloy layer is sandwiched between Fe layers, and a laminate in which a CoFeB alloy layer is sandwiched between CoFe layers.

The first ferromagnetic layer 31 may be an in-plane magnetization film having an axis of easy magnetization in a direction within a film surface or a perpendicular magnetization film having an axis of easy magnetization in the direction perpendicular to the film surface (the lamination direction of the magnetic element 30).

A thickness of the first ferromagnetic layer 31 is, for example, 1 nm or more and 5 nm or less. The thickness of the first ferromagnetic layer 31 may be, for example, 1 nm or more and 2 nm or less. If the thickness of the first ferromagnetic layer 31 is thin when the first ferromagnetic layer 31 is a perpendicular magnetization film, the effect of applying perpendicular magnetic anisotropy from the layers above and below the first ferromagnetic layer 31 is strengthened and perpendicular magnetic anisotropy of the first ferromagnetic layer 31 increases. That is, when the perpendicular magnetic anisotropy of the first ferromagnetic layer 31 is high, a force for the magnetization to return in the direction perpendicular to the film surface is strengthened. On the other hand, when the thickness of the first ferromagnetic layer 31 is thick, the effect of applying the perpendicular magnetic anisotropy from the layers above and below the first ferromagnetic layer 31 is relatively weakened and the perpendicular magnetic anisotropy of the first ferromagnetic layer 31 is weakened.

The volume of a ferromagnet becomes small when the thickness of the first ferromagnetic layer 31 becomes thin. The volume of a ferromagnet becomes large when the thickness of the first ferromagnetic layer 31 becomes thick. The susceptibility of the magnetization of the first ferromagnetic layer 31 when external energy has been applied is inversely proportional to a product (KuV) of the magnetic anisotropy (Ku) and the volume (V) of the first ferromagnetic layer 31. That is, when the product of the magnetic anisotropy and the volume of the first ferromagnetic layer 31 becomes small, the reactivity to light increases. From this point of view, the magnetic anisotropy of the first ferromagnetic layer 31 is appropriately designed and then the volume of the first ferromagnetic layer 31 may be reduced to increase the reaction to light.

When the thickness of the first ferromagnetic layer 31 is thicker than 2 nm, an insertion layer made of, for example, Mo and W may be provided within the first ferromagnetic layer 31. That is, the first ferromagnetic layer 31 may be a laminate in which the ferromagnetic layer, the insertion layer, and the ferromagnetic layer are laminated in that order. Interfacial magnetic anisotropy at an interface between the insertion layer and the ferromagnetic layer enhances the perpendicular magnetic anisotropy of the entire first ferromagnetic layer 31. A thickness of the insertion layer is, for example, 0.1 nm to 0.6 nm.

The second ferromagnetic layer 32 is a magnetization fixed layer. The magnetization fixed layer is a layer made of a magnet whose magnetization state is less likely to change than that of the magnetization free layer when prescribed external energy has been applied. For example, in the magnetization fixed layer, a direction of magnetization is less likely to change than that in the magnetization free layer when prescribed external energy has been applied. Also, for example, in the magnetization fixed layer, a magnitude of magnetization is less likely to change than that in the magnetization free layer when prescribed external energy is applied. For example, coercivity of the second ferromagnetic layer 32 is greater than that of the first ferromagnetic layer 31. For example, the second ferromagnetic layer 32 has an axis of easy magnetization in the same direction as the first ferromagnetic layer 31. The second ferromagnetic layer 32 may be either an in-plane magnetization film or a perpendicular magnetization film.

For example, the material constituting the second ferromagnetic layer 32 is similar to that of the first ferromagnetic layer 31. The second ferromagnetic layer 32 may be, for example, a laminate in which Co having a thickness of 0.4 nm or more and 1.0 nm or less, Mo having a thickness of 0.1 nm or more and 0.5 nm or less, a CoFeB alloy having a thickness of 0.3 nm or more and 1.0 nm or less, and Fe having a thickness of 0.3 nm or more and 1.0 nm or less are laminated in that order.

The magnetization of the second ferromagnetic layer 32 may be fixed by, for example, magnetic coupling to the third ferromagnetic layer via a magnetic coupling layer. In this case, a combination of the second ferromagnetic layer 32, the magnetic coupling layer, and the third ferromagnetic layer may be called a magnetization fixed layer.

The third ferromagnetic layer is magnetically coupled to, for example, the second ferromagnetic layer 32. The magnetic coupling is, for example, antiferromagnetic coupling and is caused by Ruderman-Kittel-Kasuya-Yosida (RKKY) interaction. The material constituting the third ferromagnetic layer is, for example, similar to that of the first ferromagnetic layer 31. The magnetic coupling layer is, for example, Ru, Ir, or the like.

The spacer layer 33 is a nonmagnetic layer arranged between the first ferromagnetic layer 31 and the second ferromagnetic layer 32. The spacer layer 33 includes a layer made of a conductor, an insulator, or a semiconductor or a layer including a current-carrying point formed of a conductor within an insulator. A thickness of the spacer layer 33 can be adjusted in accordance with orientation directions of the magnetization of the first ferromagnetic layer 31 and the magnetization of the second ferromagnetic layer 32 in an initial state to be described below.

For example, when the spacer layer 33 is made of an insulator, the magnetic element 30 has a magnetic tunnel junction (MTJ) including the first ferromagnetic layer 31, the spacer layer 33, and the second ferromagnetic layer 32. Such an element is called an MTJ element. In this case, the magnetic element 30 can exhibit a tunnel magnetoresistance (TMR) effect. For example, when the spacer layer 33 is made of a metal, the magnetic element 30 can exhibit a giant magnetoresistance (GMR) effect. Such an element is called a GMR element. The magnetic element 30 may be called the MTJ element, the GMR element, or the like, which differs according to the constituent material of the spacer layer 33, but they may also be collectively called magnetoresistance effect elements.

When the spacer layer 33 is made of an insulating material, materials including aluminum oxide, magnesium oxide, titanium oxide, silicon oxide, and the like can be used for the spacer layer 33. Also, these insulating materials may include elements such as Al, B, Si, and Mg and magnetic elements such as Co, Fe, and Ni. A high magnetoresistance change rate can be obtained by adjusting the thickness of the spacer layer 33 such that a strong TMR effect is exhibited between the first ferromagnetic layer 31 and the second ferromagnetic layer 32. In order to use the TMR effect efficiently, the thickness of the spacer layer 33 may be 0.5 nm or more and 5.0 nm or less or 1.0 nm or more and 2.5 nm or less.

When the spacer layer 33 is made of a nonmagnetic conductive material, a conductive material such as Cu, Ag, Au, or Ru can be used. In order to use the GMR effect efficiently, the thickness of the spacer layer 33 may be 0.5 or more and 5.0 nm or less or 2.0 or more and 3.0 nm or less.

When the spacer layer 33 is made of a nonmagnetic semiconductor material, a material such as zinc oxide, indium oxide, tin oxide, germanium oxide, gallium oxide, or ITO can be used. In this case, the thickness of the spacer layer 33 may be 1.0 or more and 4.0 nm or less.

When a layer including a current-carrying point made of a conductor within a nonmagnetic insulator is applied as the spacer layer 33, a structure may be formed to include a current-carrying point made of a nonmagnetic conductor of Cu, Au, Al, or the like within the nonmagnetic insulator made of aluminum oxide or magnesium oxide. Also, the conductor may be made of a magnetic element such as Co, Fe, or Ni. In this case, the thickness of the spacer layer 33 may be 1.0 or more and 2.5 nm or less. The current-carrying point is, for example, a columnar body having a diameter of 1 nm or more and 5 nm or less when viewed from a direction perpendicular to a film surface.

The magnetic element 30 may also have a base layer, a cap layer, a perpendicular magnetization inducing layer, and the like. The base layer is below the second ferromagnetic layer 32. The base layer is a seed layer or a buffer layer. The seed layer enhances the crystallinity of the layer laminated on the seed layer. The seed layer is, for example, Pt, Ru, Hf, Zr, or NiFeCr. The thickness of the seed layer is, for example, 1 nm or more and 5 nm or less. The buffer layer is a layer that alleviates lattice mismatch between different crystals. The buffer layer is, for example, Ta, Ti, W, Zr, Hf, or a nitride of these elements. The thickness of the buffer layer is, for example, 1 nm or more and 5 nm or less.

The cap layer is on the first ferromagnetic layer 31. The cap layer prevents damage to the lower layer during the process and enhances the crystallinity of the lower layer during annealing. The thickness of the cap layer is, for example, 3 nm or less. The cap layer is, for example, MgO, W, Mo, Ru, Ta, Cu, Cr, or a laminated film thereof.

The perpendicular magnetization inducing layer is formed when the first ferromagnetic layer 31 is a perpendicular magnetization film. The perpendicular magnetization inducing layer is laminated on the first ferromagnetic layer 31. The perpendicular magnetization inducing layer induces perpendicular magnetic anisotropy of the first ferromagnetic layer 31. The perpendicular magnetization inducing layer is, for example, magnesium oxide, W, Ta, Mo, or the like. When the perpendicular magnetization inducing layer is magnesium oxide, magnesium oxide may be oxygen-deficient to increase conductivity. A thickness of the perpendicular magnetization inducing layer is, for example, 0.5 nm or more and 2.0 nm or less.

The magnetic element 30 is manufactured, for example, in a laminating step, an annealing step, and a processing step for each layer. Each layer is formed by, for example, sputtering. Annealing is performed, for example, at 250° C. or higher and 450° C. or lower. The processing of the laminated film is performed using, for example, photolithography and etching. The laminated film is a columnar magnetic element 30. The magnetic element 30 may be a cylinder or a prism. For example, the shortest width when the magnetic element 30 is viewed from the lamination direction may be 10 nm or more and 2000 nm or less or 30 nm or more and 500 nm or less. In the above-described steps, the magnetic element 30 is obtained.

The magnetic element 30 can be manufactured regardless of the material constituting the base. Thus, the magnetic element 30 can be directly manufactured on the substrate 10 without using an adhesive layer or the like. For example, the magnetic element 30 is formed on the substrate 10 via the insulating layer 48 or the like in a vacuum film forming process.

Next, some examples of the operation of the magnetic element 30 will be described. Light L2 is applied to the first ferromagnetic layer 31. The magnetic element 30 detects a change in the intensity of the light L2. The output voltage from the magnetic element 30 changes due to a change in the intensity of the light L2 applied to the first ferromagnetic layer 31. Although the exact mechanism by which the output voltage from the magnetic element 30 changes due to light application has not yet been clarified, for example, the following two mechanisms can be taken into account.

Figure 6:
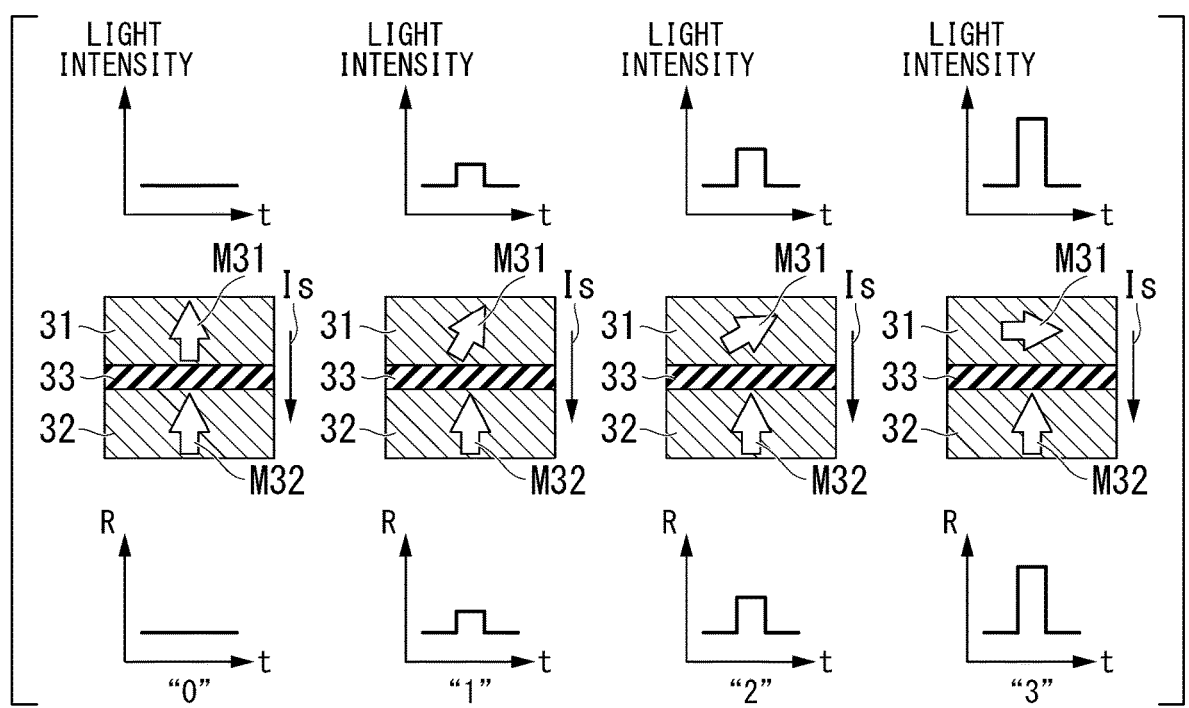
FIG. 6 is a diagram for describing a first mechanism of an operation of the magnetic element according to the first embodiment.

FIG. 6 is a diagram for describing a first mechanism of an operation of the magnetic element 30 according to the first embodiment. In the upper graph of FIG. 6, the vertical axis represents an intensity of the light L2 applied to the first ferromagnetic layer 31 and the horizontal axis represents time. In the lower graph of FIG. 6, the vertical axis represents a resistance value of the magnetic elements 30 in the lamination direction and the horizontal axis represents time.

First, in a state in which light of a first intensity has been applied to the first ferromagnetic layer 31 (hereinafter referred to as an initial state), the magnetization M31 of the first ferromagnetic layer 31 and the magnetization M32 of the second ferromagnetic layer 32 are parallel to each other, the resistance value of the magnetic element 30 in the lamination direction is a first resistance value $R_1$, and a magnitude of the output voltage from the magnetic element 30 has a first value. The first intensity may correspond to a case where the intensity of the light applied to the first ferromagnetic layer 31 is zero.

For example, the resistance value of the magnetic element 30 in the lamination direction is obtained using Ohm's law from a voltage value when a voltage is generated at both ends of the magnetic element 30 if a sense current Is flows through the magnetic element 30 in the lamination direction. The output voltage from the magnetic element 30 is generated between the electrode 41 and the electrode 42. In the case of the example shown in FIG. 6, the sense current Is may allow to flow from the first ferromagnetic layer 31 to the second ferromagnetic layer 32. By allowing the sense current Is to flow in this direction, the spin transfer torque having the same direction as the magnetization M32 of the second ferromagnetic layer 32 acts on the magnetization M31 of the first ferromagnetic layer 31 and the magnetization M31 and the magnetization M32 become parallel to each other in the initial state. Also, by allowing the sense current Is to flow in this direction, it is possible to prevent the magnetization M31 of the first ferromagnetic layer 31 from being inverted during the operation.

Next, the intensity of the light L2 applied to the first ferromagnetic layer 31 changes. The magnetization M31 of the first ferromagnetic layer 31 is inclined from the initial state by the external energy generated by the application of the light L2. Angles of both the direction of the magnetization M31 of the first ferromagnetic layer 31 when no light is applied to the first ferromagnetic layer 31 and the direction of the magnetization M31 when light is applied to the first ferromagnetic layer 31 are greater than 0° and less than 90°.

When the magnetization M31 of the first ferromagnetic layer 31 is inclined from the initial state, the resistance value of the magnetic element 30 in the lamination direction changes. The output voltage from the magnetic element 30 changes. For example, the inclination of the magnetization M31 with respect to the initial state increases as the intensity of the light L2 applied to the magnetic element 30 increases.

For example, the resistance value of the magnetic element 30 in the lamination direction changes to the second resistance value $R_2$, the third resistance value $R_3$, and the fourth resistance value $R_4$ in accordance with the inclination of the magnetization M31 of the first ferromagnetic layer 31. The resistance value increases in the order of the first resistance value $R_1$, the second resistance value $R_2$, the third resistance value $R_3$, and the fourth resistance value $R_4$. That is, the output voltage from the magnetic element 30 changes from the first voltage value to the second voltage value, the third voltage value, and the fourth voltage value in accordance with the inclination of the magnetization M31 of the first ferromagnetic layer 31. The output voltage increases in the order of the first voltage value, the second voltage value, the third voltage value, and the fourth voltage value.

In the magnetic element 30, when the intensity of the light L2 applied to the magnetic element 30 has changed, the output voltage from the magnetic element 30 (the resistance value of the magnetic element 30 in the lamination direction) changes. The output voltage from the magnetic element 30 changes in correspondence with a change in the intensity of the light L2 applied to the first ferromagnetic layer 31. In other words, the magnetic element 30 can convert the change in the intensity of the applied light L2 into the change in the output voltage. That is, the magnetic element 30 can convert the received light into an electrical signal. Although a case where four values are read is shown as an example here, the number of values to be read can be freely designed by setting a threshold value for the output voltage from the magnetic element 30. Also, the magnetic element 30 may output an analog value as it is.

The spin transfer torque having the same direction as the magnetization M32 of the second ferromagnetic layer 32 acts on the magnetization M31 of the first ferromagnetic layer 31. Therefore, when the intensity of the light L2 applied to the first ferromagnetic layer 31 returns to the first intensity, the magnetization M31 inclined from the initial state returns to the initial state. When the magnetization M31 returns to the initial state, the resistance value of the magnetic element 30 in the lamination direction returns to the first resistance value $R_1$.

Although the case where the magnetization M31 and the magnetization M32 are parallel to each other in the initial state has been described as an example here, the magnetization M31 and the magnetization M32 may be antiparallel to each other in the initial state. In this case, the resistance value of the magnetic element 30 in the lamination direction decreases as the inclination of the magnetization M31 increases (as a change in an angle from the initial state of the magnetization M31 increases). When a state in which the magnetization M31 and the magnetization M32 are antiparallel to each other is the initial state, the sense current Is may allow to flow from the second ferromagnetic layer 32 to the first ferromagnetic layer 31. By allowing the sense current is to flow this direction, the spin transfer torque in a direction opposite to that of the magnetization M32 of the second ferromagnetic layer 32 acts on the magnetization M31 of the first ferromagnetic layer 31 and the magnetization M31 and the magnetization M32 become antiparallel to each other in the initial state.

Figure 7:
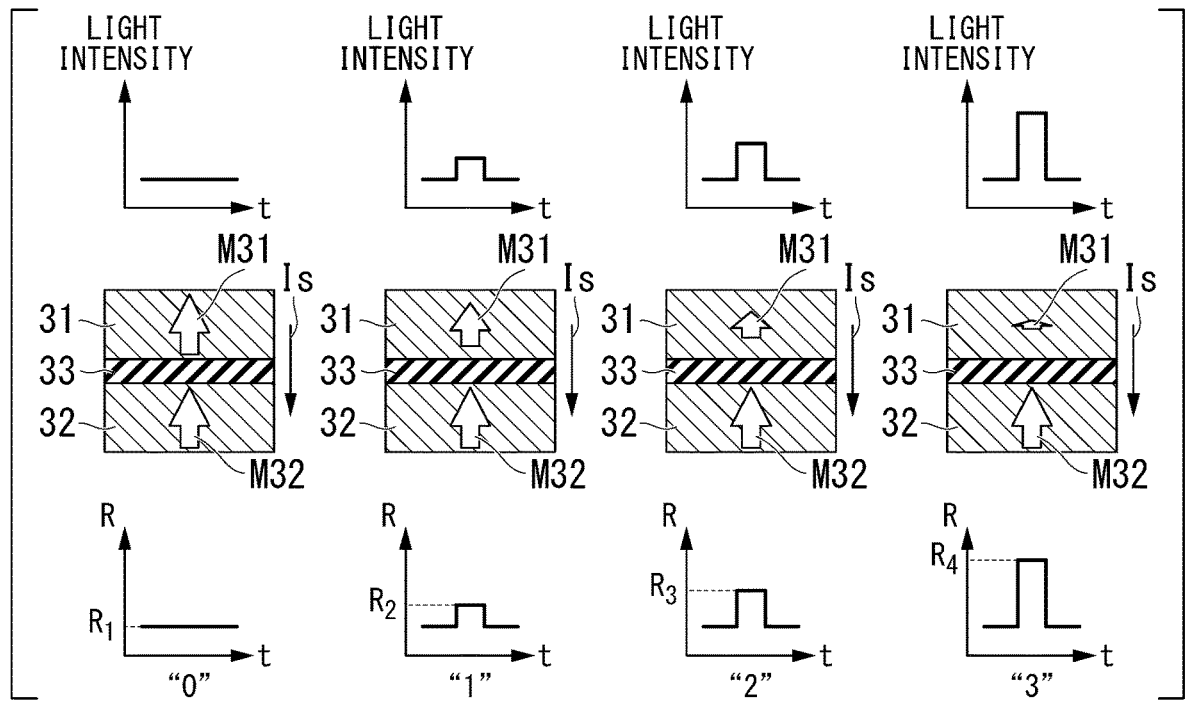
FIG. 7 is a diagram for describing a second mechanism of the operation of the magnetic element according to the first embodiment.

FIG. 7 is a diagram for describing a second mechanism of an operation of the magnetic element 30 according to the first embodiment. In the upper graph of FIG. 7, the vertical axis represents an intensity of the light L2 applied to the first ferromagnetic layer 31 and the horizontal axis represents time. In the lower graph of FIG. 7, the vertical axis represents a resistance value of the magnetic element 30 in the lamination direction and the horizontal axis represents time.

The initial state shown in FIG. 7 is similar to the initial state shown in FIG. 6. Also, in the case of the example shown in FIG. 7, the sense current is may allow to flow from the first ferromagnetic layer 31 to the second ferromagnetic layer 32. By allowing the sense current Is to flow in this direction, the spin transfer torque having the same direction as the magnetization M32 of the second ferromagnetic layer 32 acts on the magnetization M31 of the first ferromagnetic layer 31 and the initial state is maintained.

Next, the intensity of the light L2 applied to the first ferromagnetic layer 31 changes. The magnitude of the magnetization M31 of the first ferromagnetic layer 31 decreases from the initial state due to the external energy generated by the application of the light L2. When the magnetization M31 of the first ferromagnetic layer 31 decreases from the initial state, the resistance value of the magnetic element 30 in the lamination direction changes. The output voltage from the magnetic element 30 changes. For example, the magnitude of the magnetization M31 decreases as the intensity of the light L2 applied to the magnetic element 30 increases. For example, the resistance value of the magnetic element 30 in the lamination direction changes to the second resistance value $R_2$, the third resistance value $R_3$, and the fourth resistance value $R_4$ in accordance with the magnitude of the magnetization M31 of the first ferromagnetic layer 31. The resistance value increases in the order of the first resistance value $R_1$, the second resistance value $R_2$, the third resistance value $R_3$, and the fourth resistance value $R_4$. That is, the output voltage from the magnetic element 30 changes from the first voltage value to the second voltage value, the third voltage value, and the fourth voltage value in accordance with the magnitude of the magnetization M31 of the first ferromagnetic layer 31. The output voltage increases in the order of the first voltage value, the second voltage value, the third voltage value, and the fourth voltage value.

When the intensity of the light applied to the first ferromagnetic layer 31 returns to the first intensity, the magnitude of the magnetization M31 of the first ferromagnetic layer 31 returns to the original magnitude and the magnetic element 30 returns to the initial state. That is, the resistance value of the magnetic element 30 in the lamination direction returns to the first resistance value $R_1$.

Also in FIG. 7, the magnetization M31 and the magnetization M32 may be antiparallel to each other in the initial state. In this case, the resistance value of the magnetic element 30 in the lamination direction decreases as the magnitude of the magnetization M31 decreases. When a state in which the magnetization M31 and the magnetization M32 are antiparallel to each other is the initial state, the sense current Is may allow to flow from the second ferromagnetic layer 32 to the first ferromagnetic layer 31.

Although an example in which the magnetization M31 and the magnetization M32 are parallel or antiparallel to each other in the initial state has been described with reference to FIGS. 6 and 7, the magnetization M31 and the magnetization M32 may be orthogonal to each other in the initial state. For example, this case is a case where the first ferromagnetic layer 31 is an in-plane magnetization film in which the magnetization M31 is oriented in a direction within a film surface and the second ferromagnetic layer 32 is a perpendicular magnetization film in which the magnetization M32 is oriented in the direction perpendicular to the film surface. The magnetization M31 is oriented in any-direction in the film surface due to magnetic anisotropy and the magnetization M32 is oriented in a direction perpendicular to the film surface, such that the magnetization M31 and the magnetization M32 are orthogonal to each other in the initial state.

Figure 8:
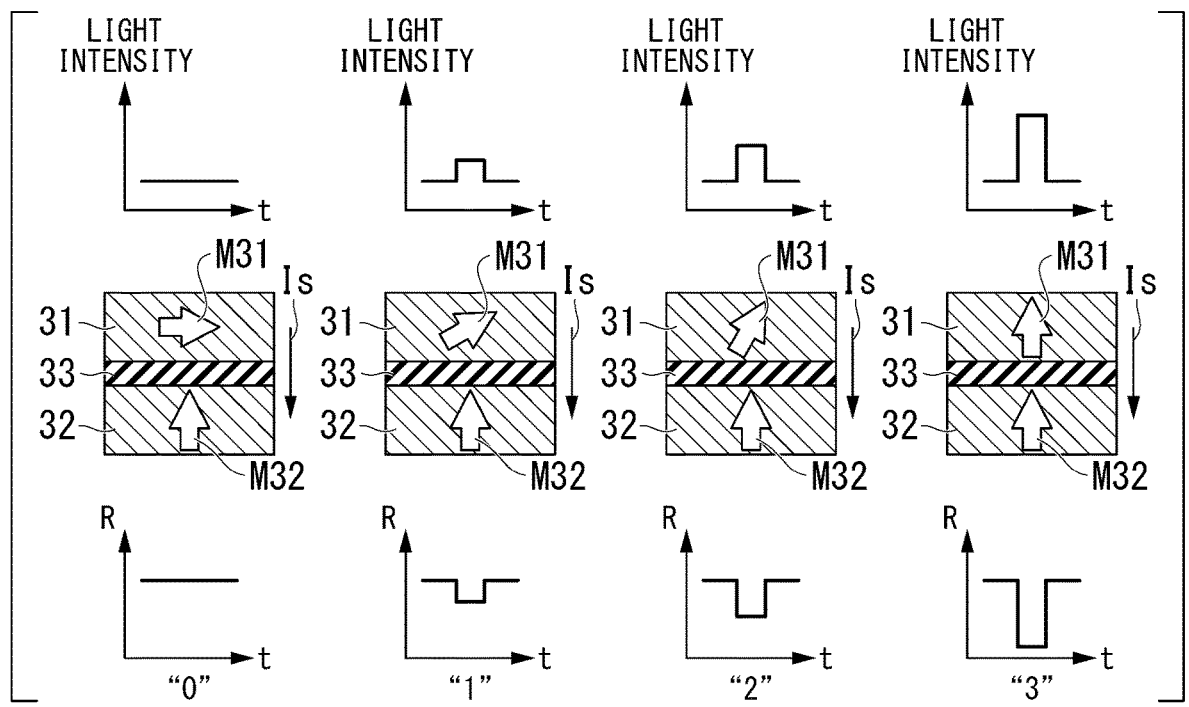
FIG. 8 is a diagram for describing another example of the operation of the magnetic element according to the first embodiment.
Figure 9:
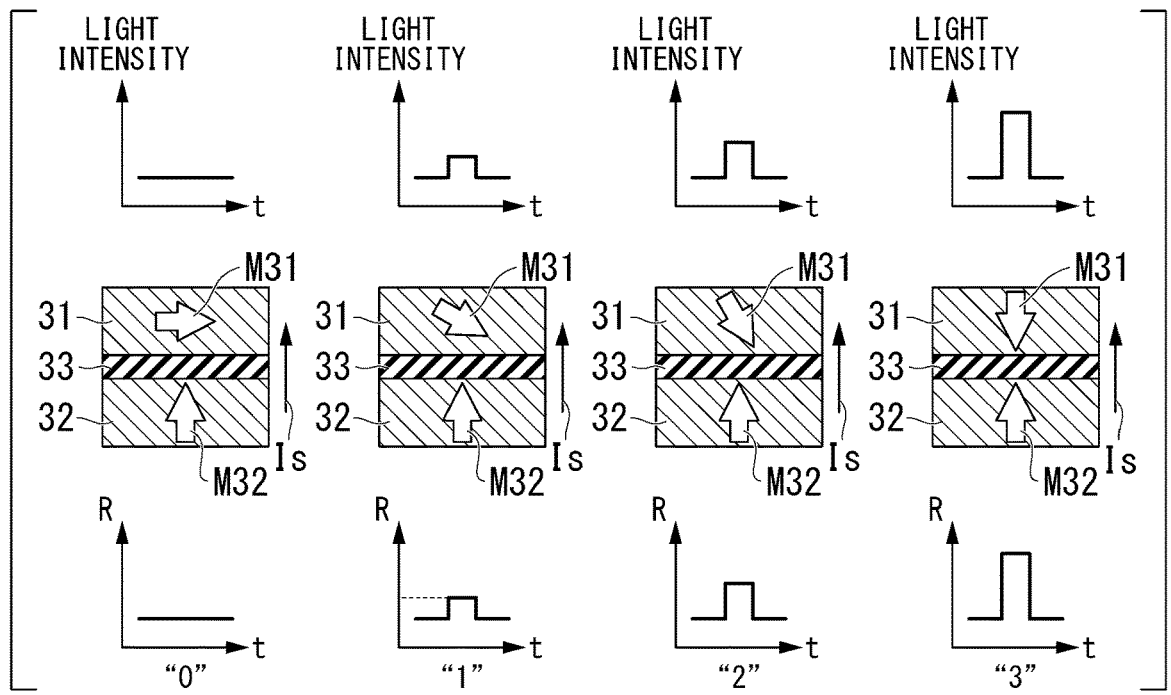
FIG. 9 is a diagram for describing another example of the operation of the magnetic element according to the first embodiment.

FIGS. 8 and 9 are diagrams for describing other examples of the operation of the first mechanism of the magnetic element 30 according to the first embodiment. A flow direction of the sense current is applied to the magnetic element 30 is different between FIGS. 8 and 9. In FIG. 8, the sense current Is is flowing from the first ferromagnetic layer 31 to the second ferromagnetic layer 32. In FIG. 9, the sense current Is is flowing from the second ferromagnetic layer 32 to the first ferromagnetic layer 31.

In either case of FIGS. 8 and 9, the sense current Is flows through the magnetic element 30, such that the spin transfer torque acts on the magnetization M31 in the initial state. In the case of FIG. 8, the spin transfer torque acts such that the magnetization M31 is parallel to the magnetization M32 of the second ferromagnetic layer 32. In the case of FIG. 9, the spin transfer torque acts such that the magnetization M31 is antiparallel to the magnetization M32 of the second ferromagnetic layer 32. In either case of FIGS. 8 and 9, the action of magnetic anisotropy on the magnetization M31 is greater than the action of the spin transfer torque in the initial state, such that the magnetization M31 is oriented in any-direction in the film surface.

When the intensity of the light L2 applied to the first ferromagnetic layer 31 increases, the magnetization M31 of the first ferromagnetic layer 31 is inclined from the initial state due to the external energy generated by the application of the light L2. This is because a sum of the action due to the application of the light L2 applied to the magnetization M31 and the action due to the spin transfer torque is greater than the action due to the magnetic anisotropy related to the magnetization M31. When the intensity of the light L2 applied to the first ferromagnetic layer 31 increases, the magnetization M31 in the case of FIG. 8 is inclined to be parallel to the magnetization M32 of the second ferromagnetic layer 32 and the magnetization M31 in the case of FIG. 9 is inclined to be antiparallel to the magnetization M32 of the second ferromagnetic layer 32. Because directions of the spin transfer torque acting on the magnetization M31 are different, inclination directions of the magnetization M31 in FIGS. 8 and 9 are different.

When the intensity of the light applied to the first ferromagnetic layer 31 increases, the resistance value of the magnetic element 30 in the lamination direction decreases in the case of FIG. 8 and the resistance value of the magnetic element 30 in the lamination direction increases in the case of FIG. 9. That is, when the intensity of the light applied to the first ferromagnetic layer 31 increases, the output voltage from the magnetic element 30 decreases in the case of FIG. 8 and the output voltage of the magnetic element 30 increases in the case of FIG. 9.

When the intensity of the light L2 applied to the first ferromagnetic layer 31 returns to the first intensity, the state of the magnetization M31 of the first ferromagnetic layer 31 returns to the original state due to the action of magnetic anisotropy on the magnetization M31. As a result, the magnetic element 30 returns to the initial state.

Although an example in which the first ferromagnetic layer 31 is an in-plane magnetization film and the second ferromagnetic layer 32 is a perpendicular magnetization film has been described, this relationship may be reversed. That is, in the initial state, the magnetization M31 may be oriented in the direction perpendicular to the film surface and the magnetization M32 may be oriented in any-direction in the film surface.

As described above, the magnetic element 30 receives the light L2 and converts the received light L2 into an electrical signal. The light L2 is converted into the electrical signal in the magnetic element 30 and therefore it is possible to monitor a change in the intensity of the light L1 and a part of the light L2 (the light L2) emitted from the laser diode 20 via the magnetic element 30.

The change in the intensity of the light L1 emitted from the first emission portion 24 of the laser diode 20 corresponds to the change in the intensity of the light L2 emitted from the second emission portion 25. The change in the intensity of the light L2 in the magnetic element 30 is monitored and therefore the change in the intensity of the externally emitted light L1 can be monitored.

Also, the magnetization M31 of the first ferromagnetic layer 31 is more likely to change with respect to the application of the light L2 when the volume of the first ferromagnetic layer 31 is smaller. That is, a state of the magnetization M31 of the first ferromagnetic layer 31 is more likely to change due to the application of the light L2 when the volume of the first ferromagnetic layer 31 is smaller. In other words, if the volume of the first ferromagnetic layer 31 is reduced, the magnetization M31 can be changed even with a small amount of light. That is, the magnetic element 30 according to the first embodiment can detect light with high sensitivity.

More precisely, the susceptibility of the magnetization M31 is determined by a magnitude of a product (KuV) of the magnetic anisotropy (Ku) and the volume (V) of the first ferromagnetic layer 31. The magnetization M31 changes with a smaller amount of light when KuV is smaller and the magnetization M31 does not change without a larger amount of light when KuV is larger. That is, KuV of the first ferromagnetic layer 31 is designed in accordance with an amount of laser light obtained by an application. When it is assumed that a significantly small amount of light is detected, KuV of the first ferromagnetic layer 31 can be reduced to detect significantly small amounts of light. Detection of such a significantly small amount of light is a great merit because it becomes difficult to reduce the element size in a conventional pn junction semiconductor. KuV can be reduced by reducing the volume of the first ferromagnetic layer 31.

Also, the magnetic element 30 can be manufactured regardless of the material constituting the base. Therefore, the magnetic element 30 can be manufactured on the same substrate as the substrate 10 that supports the laser diode 20. The magnetic element 30 can be formed in a process on the substrate 10 together with the laser diode 20. For example, the laser diode 20 and the magnetic element 30 can be formed on the same substrate 10 in a vacuum film forming process. By treating the laser diode 20 and the magnetic element 30 as one component formed on the same substrate, the number of components is reduced as compared with a case where the laser diode and the semiconductor photodiode required to be treated as separate components are used.

Second Embodiment

Figure 10:
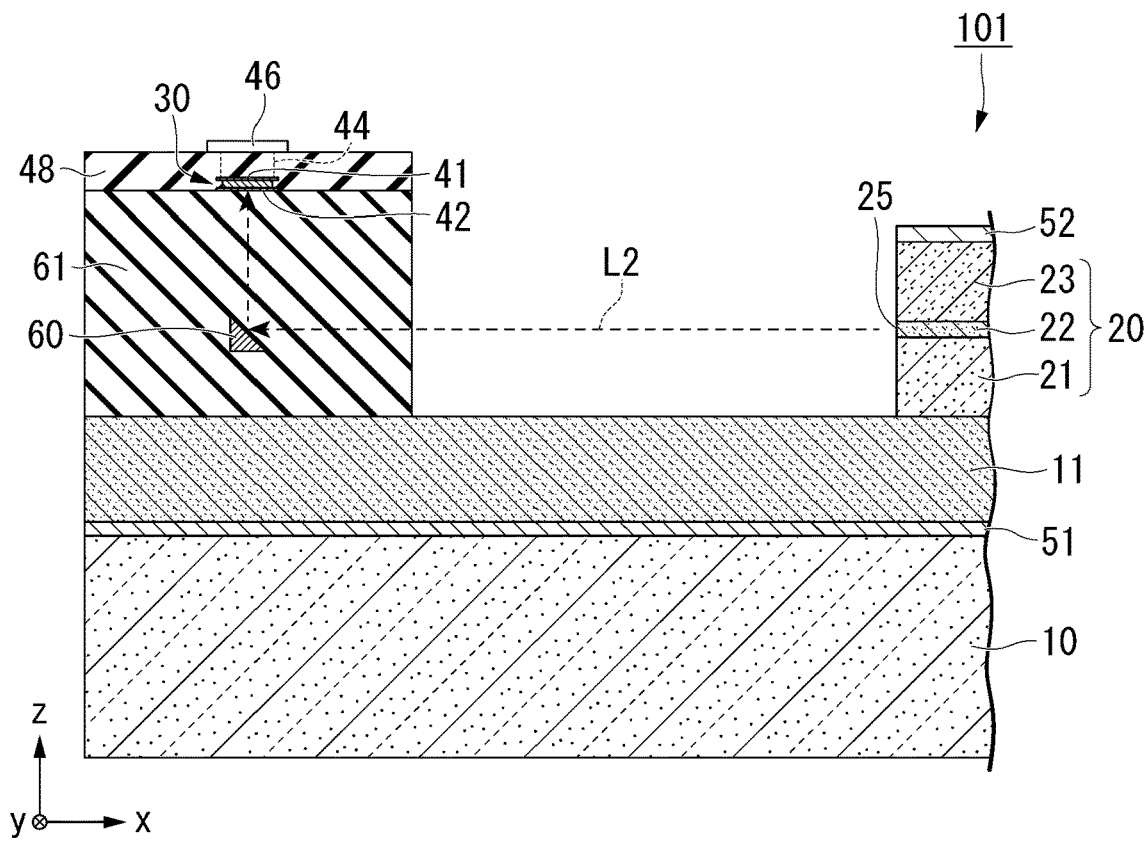
FIG. 10 is a cross-sectional view of a characteristic portion of an optical device according to a second embodiment.
Figure 11:
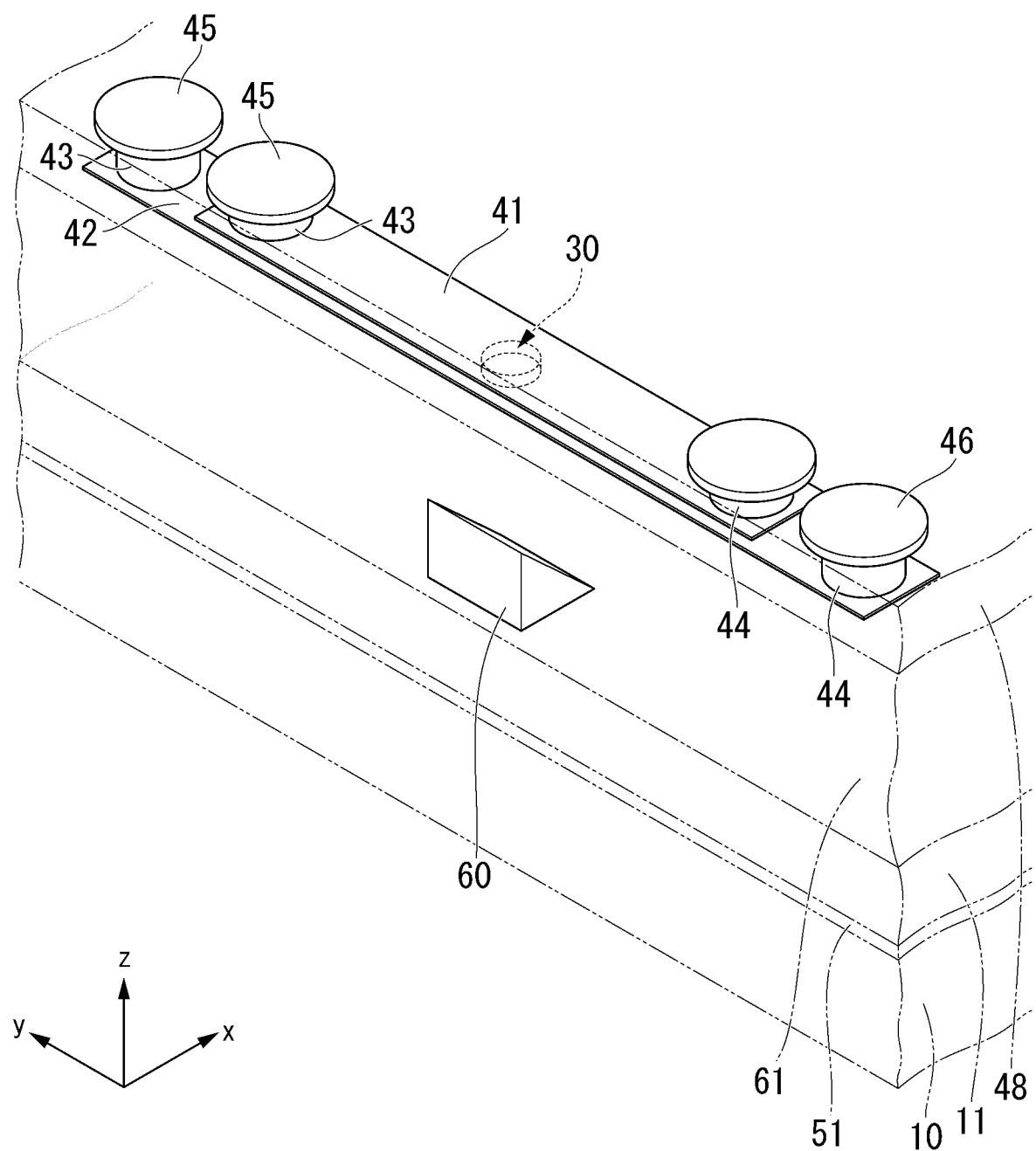
FIG. 11 is a perspective view of the vicinity of a magnetic element of the optical device according to the second embodiment.

FIG. 10 is a cross-sectional view of a characteristic portion of an optical device 101 according to a second embodiment. FIG. 11 is a perspective view of the vicinity of a magnetic element 30 of the optical device 101 according to the second embodiment. In the second embodiment, components similar to those of the first embodiment are denoted by similar reference signs and description thereof will be omitted.

The optical device 101 has a reflector 60. The reflector 60 reflects at least a part of the light (at least a part of light L2) emitted from a laser diode 20 toward the magnetic element 30. The reflector 60 is located at a position in the traveling direction of the light L2 from a second emission portion 25 of the laser diode 20. For example, a height position of the reflector 60 in the z-direction is the same as a height position of the second emission portion 25 of the laser diode 20 in the z-direction. The reflector 60 has an inclined surface that is inclined with respect to the traveling direction of the light L2.

The reflector 60 reflects light. The reflector 60 is, for example, a reflecting mirror. The periphery of the reflector 60 is covered with an insulating layer 61. A material that is the same as that of the insulating layer 48 can be used for the insulating layer 61.

The magnetic element 30 is in an insulating layer 48 on the insulating layer 61. The magnetic element 30 is above the substrate 10. The height position of the magnetic element 30 (a first ferromagnetic layer 31) in the z-direction is different from that of the second emission portion 25. The magnetic element 30 is, for example, above the reflector 60.

For example, the light L2 reflected by the reflector 60 is applied to the magnetic element 30 from the lamination direction of the magnetic element 30. In this case, an electrode 42 has transparency with respect to the wavelength range of the light L2 applied to the magnetic element 30. When the electrode 42 transmits a part of the light L2, light is applied to the magnetic element 30. Although an example in which the electrode 42 is arranged on the reflector 60 side than the electrode 41 is shown here, an electrode 41 may be arranged on the reflector 60 side than the electrode 42 (the first ferromagnetic layer 31 is may be arranged on the reflector 60 side than a second ferromagnetic layer 32). In this case, the electrode 41 has transparency in a wavelength range of the light applied to the magnetic element 30. When the electrode 41 transmits a part of the light L2, light is applied to the magnetic element 30. When the electrode 41 is arranged on the reflector 60 side than the electrode 42, the efficiency of application of the light L2 to the first ferromagnetic layer 31 is increased.

The optical device 101 according to the second embodiment has effects similar to those of the optical device 100 according to the first embodiment. Also, the reflector 60 can freely design a direction of application of the light L2 with respect to the magnetic element 30. For example, when the light L2 is applied to the magnetic element 30 from the lamination direction, a wide light-receiving area of the magnetic element 30 can be secured.

Third Embodiment

Figure 12:
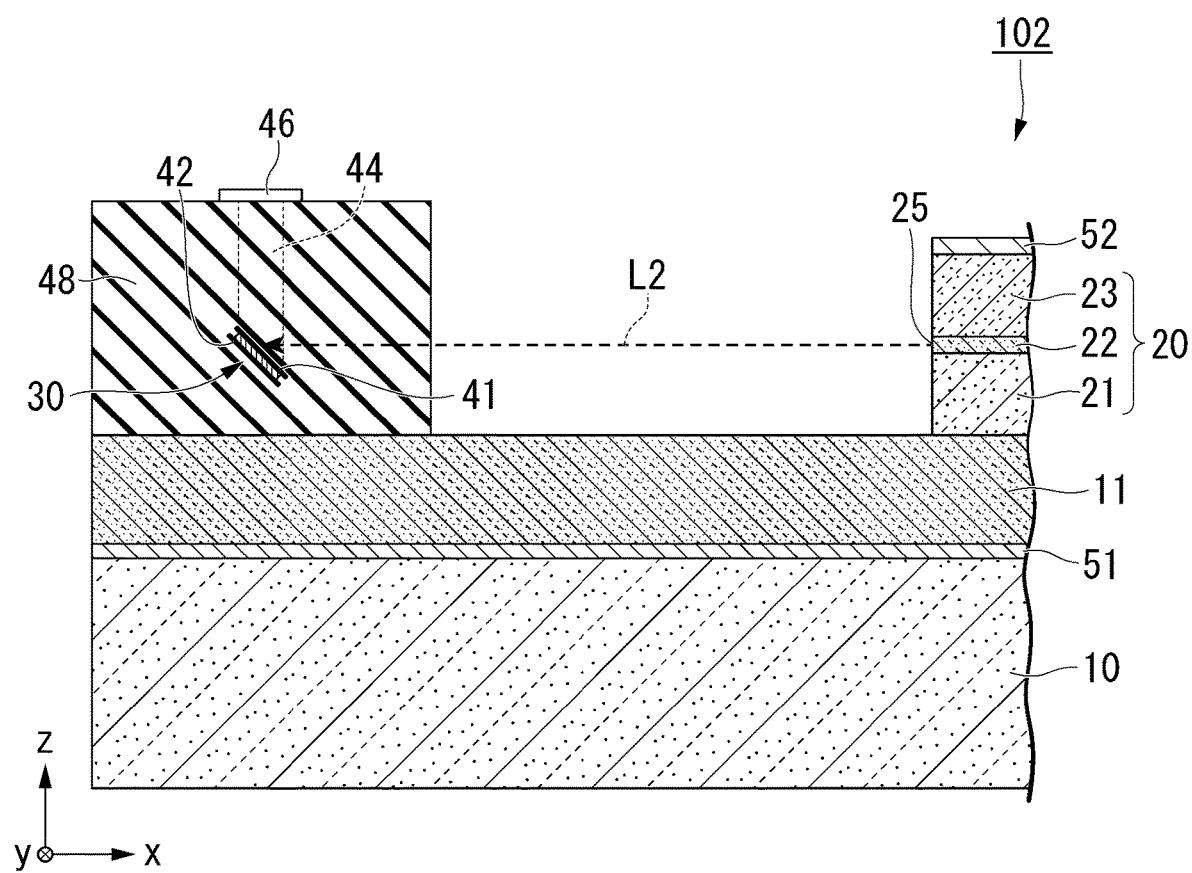
FIG. 12 is a cross-sectional view of a characteristic portion of the optical device according to a third embodiment.

FIG. 12 is a cross-sectional view of a characteristic portion of an optical device 102 according to a third embodiment. In the third embodiment, components similar to those of the first embodiment are denoted by similar reference signs and description thereof will be omitted.

In the optical device 102 according to the third embodiment, a lamination direction of a magnetic element 30 is inclined with respect to the z-direction. Light L2 emitted from a second emission portion 25 of a laser diode 20 is applied to a side surface of the magnetic element 30 and a first surface of the magnetic element 30 on an electrode 41 side.

The optical device 102 according to the third embodiment has effects similar to those of the optical device 100 according to the first embodiment.

Fourth Embodiment

Figure 13:
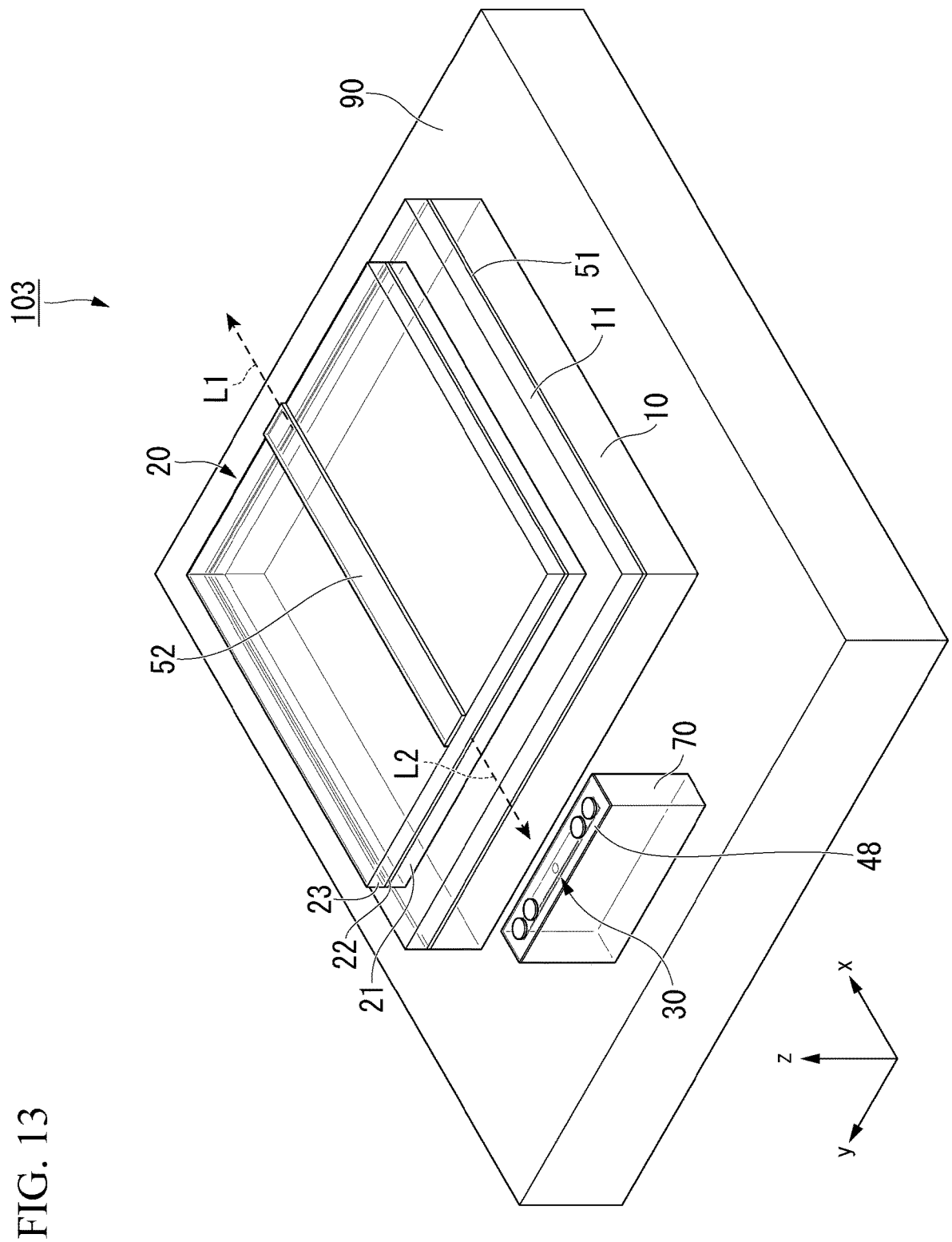
FIG. 13 is a perspective view of an optical device according to a fourth embodiment.
Figure 14:
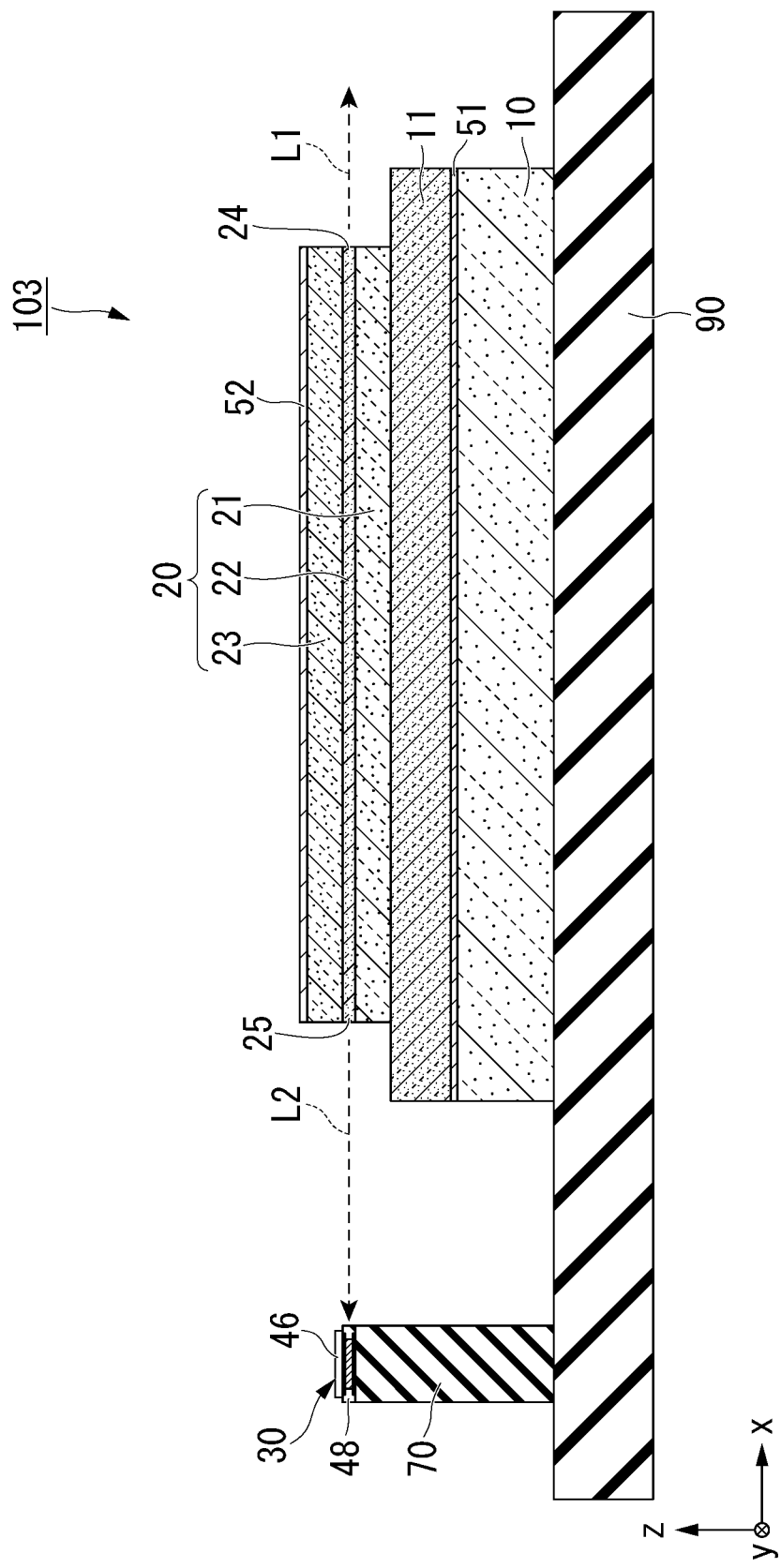
FIG. 14 is a cross-sectional view of the optical device according to the fourth embodiment.

FIG. 13 is a perspective view of an optical device 103 according to a fourth embodiment. FIG. 14 is a cross-sectional view of the optical device 103 according to the fourth embodiment. In the fourth embodiment, components similar to those of the first embodiment are denoted by similar reference signs and description thereof will be omitted.

The optical device 103 has a substrate 10 that supports a laser diode 20 and a support body 70 that supports a magnetic element 30. The support body 70 is a member different from a substrate 10 on which the laser diode 20 is formed. The support body 70 and the substrate 10 may be fixed on a common support component 90, for example, as shown in FIGS. 13 and 14. The laser diode 20 is on or above the substrate 10. The magnetic element 30 is on or above the support body 70. Although an example in which the laser diode 20 and the magnetic element 30 are formed on the same substrate 10 or above the same substrate 10 has been described in the first to third embodiments, the laser diode 20 and the magnetic element 30 are formed on different members in the fourth embodiment.

For example, the support body 70 is made of a material similar to that of the substrate 10. The magnetic element 30 is in an insulating layer 48 on the support body 70.

For example, a height position of the magnetic element 30 in the z-direction coincides with a height position of the second emission portion 25 of the laser diode 20 in the z-direction. At least a part of the light (at least a part of light L2) emitted from the laser diode 20 is applied to the magnetic element 30 from a direction intersecting a lamination direction (the z-direction) of the magnetic element 30.

Even if the laser diode 20 and the magnetic element 30 are formed on different members, the optical device 103 can monitor a change in the intensity of at least a part of the light (at least a part of the light L2) emitted from the laser diode 20 using the magnetic element 30. That is, the optical device 103 can monitor the change in the intensity of the light L1 externally emitted from the laser diode 20.

Fifth Embodiment

Figure 15:
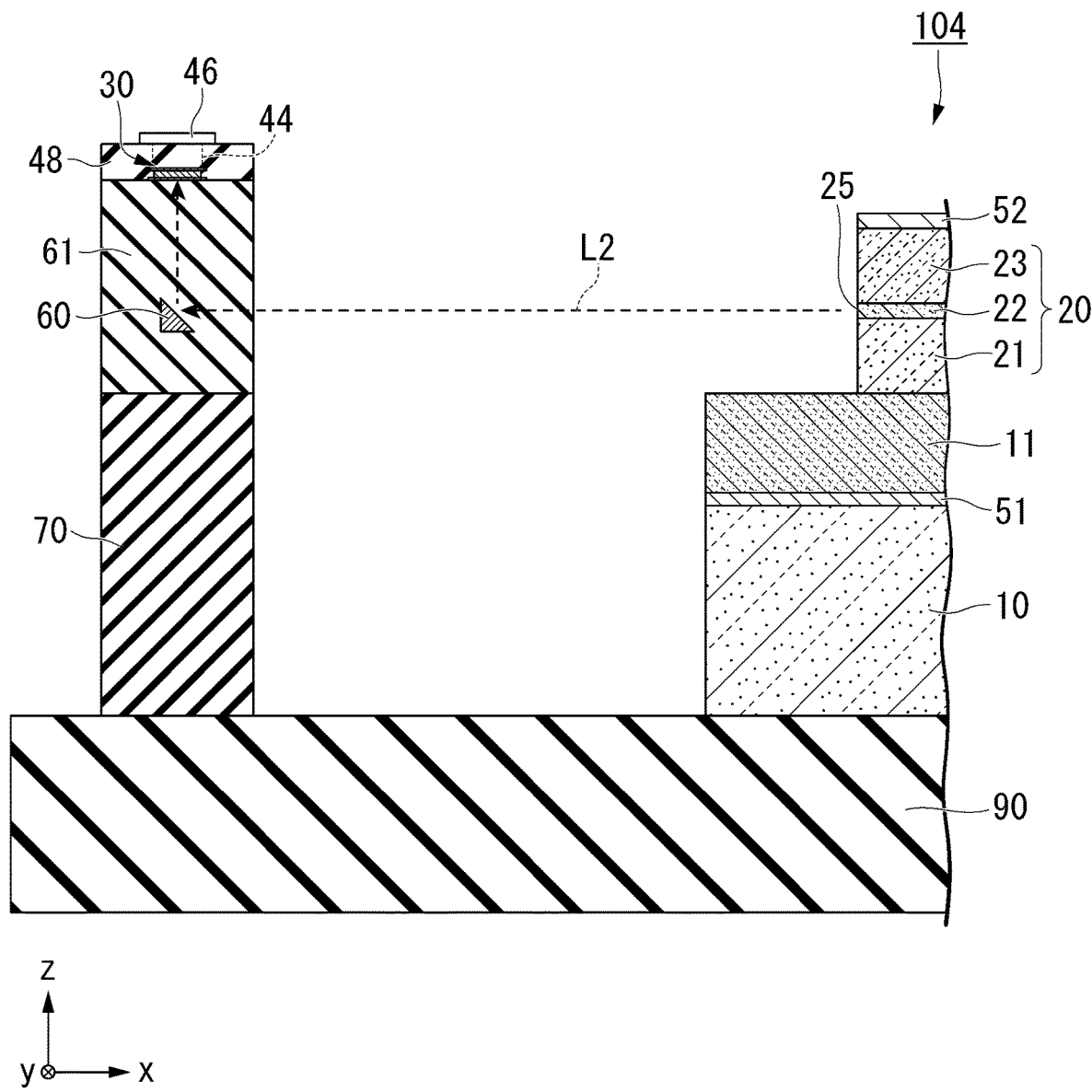
FIG. 15 is a cross-sectional view of a characteristic portion of an optical device according to a fifth embodiment.

FIG. 15 is a cross-sectional view of a characteristic portion of an optical device 104 according to a fifth embodiment. In the fifth embodiment, components similar to those of the above-described embodiment are denoted by similar reference signs and description thereof will be omitted.

In the optical device 104, a substrate 10 that supports a laser diode 20 and a support body 70 that supports a magnetic element 30 are different members. The laser diode 20 is on or above the substrate 10. The magnetic element 30 is on or above the support body 70. The magnetic element 30 is in an insulating layer 48 on the support body 70.

A reflector 60 covered with an insulating layer 61 is between the support body 70 and the magnetic element 30. For example, a height position of the reflector 60 in the z-direction coincides with a height position of a second emission portion 25 of the laser diode 20 in the z-direction.

The reflector 60 reflects at least a part of light (at least a part of light L2) emitted from the laser diode 20 toward the magnetic element 30. For example, the light L2 reflected by the reflector 60 is applied to the magnetic element 30 from the lamination direction of the magnetic element 30. In this case, an electrode 42 has transparency with respect to the wavelength range of the light L2 applied to the magnetic element 30. When the electrode 42 transmits a part of the light L2, light is applied to the magnetic element 30.

The optical device 104 according to the fifth embodiment is a combination of the characteristic configuration of the optical device 101 according to the second embodiment and the characteristic configuration of the optical device 103 according to the fourth embodiment. Therefore, the optical device 104 according to the fifth embodiment has effects similar to those of the optical devices 101 and 103.

Sixth Embodiment

Figure 16:
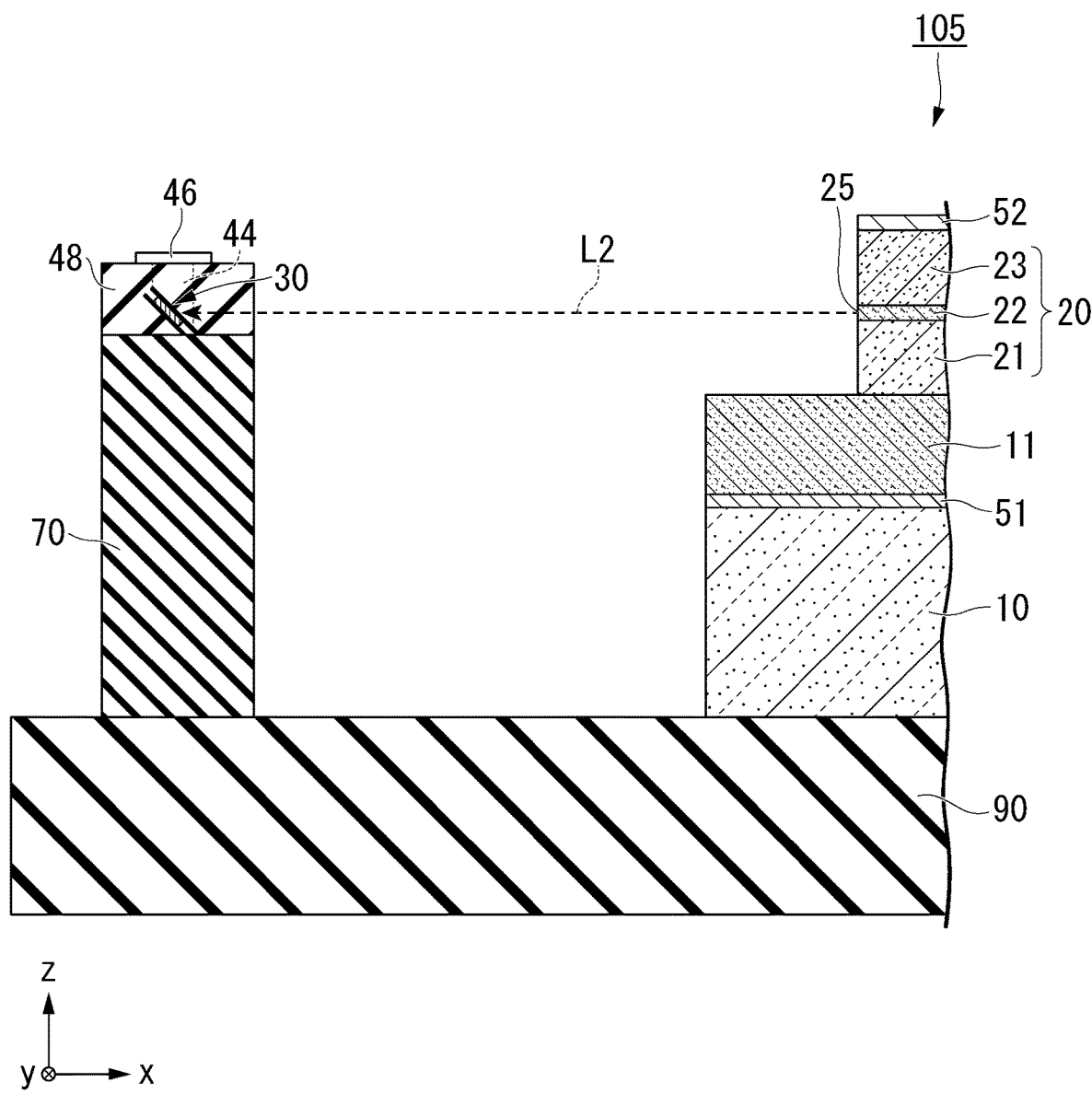
FIG. 16 is a cross-sectional view of a characteristic portion of an optical device according to a sixth embodiment.

FIG. 16 is a cross-sectional view of a characteristic portion of an optical device 105 according to a sixth embodiment. In the sixth embodiment, components similar to those of the above-described embodiment are denoted by similar reference signs and description thereof will be omitted.

In the optical device 105, a substrate 10 that supports a laser diode 20 and a support body 70 that supports a magnetic element 30 are different members. The laser diode 20 is on or above the substrate 10. The magnetic element 30 is on or above the support body 70. The lamination direction of the magnetic element 30 is inclined with respect to the z-direction. For example, a height position of the magnetic element 30 in the z-direction coincides with a height position of a second emission portion 25 of the laser diode 20 in the z-direction.

Light L2 emitted from the second emission portion 25 of the laser diode 20 is applied to a side surface of the magnetic element 30 and a first surface of the magnetic element 30 on the electrode 41 side. In this case, the electrode 41 has transparency with respect to a wavelength range of the light L2 applied to the magnetic element 30. When the electrode 41 transmits a part of the light L2, light is applied to the magnetic element 30.

The optical device 105 according to the sixth embodiment is a combination of the characteristic configuration of the optical device 102 according to the third embodiment and the characteristic configuration of the optical device 103 according to the fourth embodiment. Thus, the optical device 105 according to the sixth embodiment has effects similar to those of the optical devices 102 and 103.

Seventh Embodiment

Figure 17:
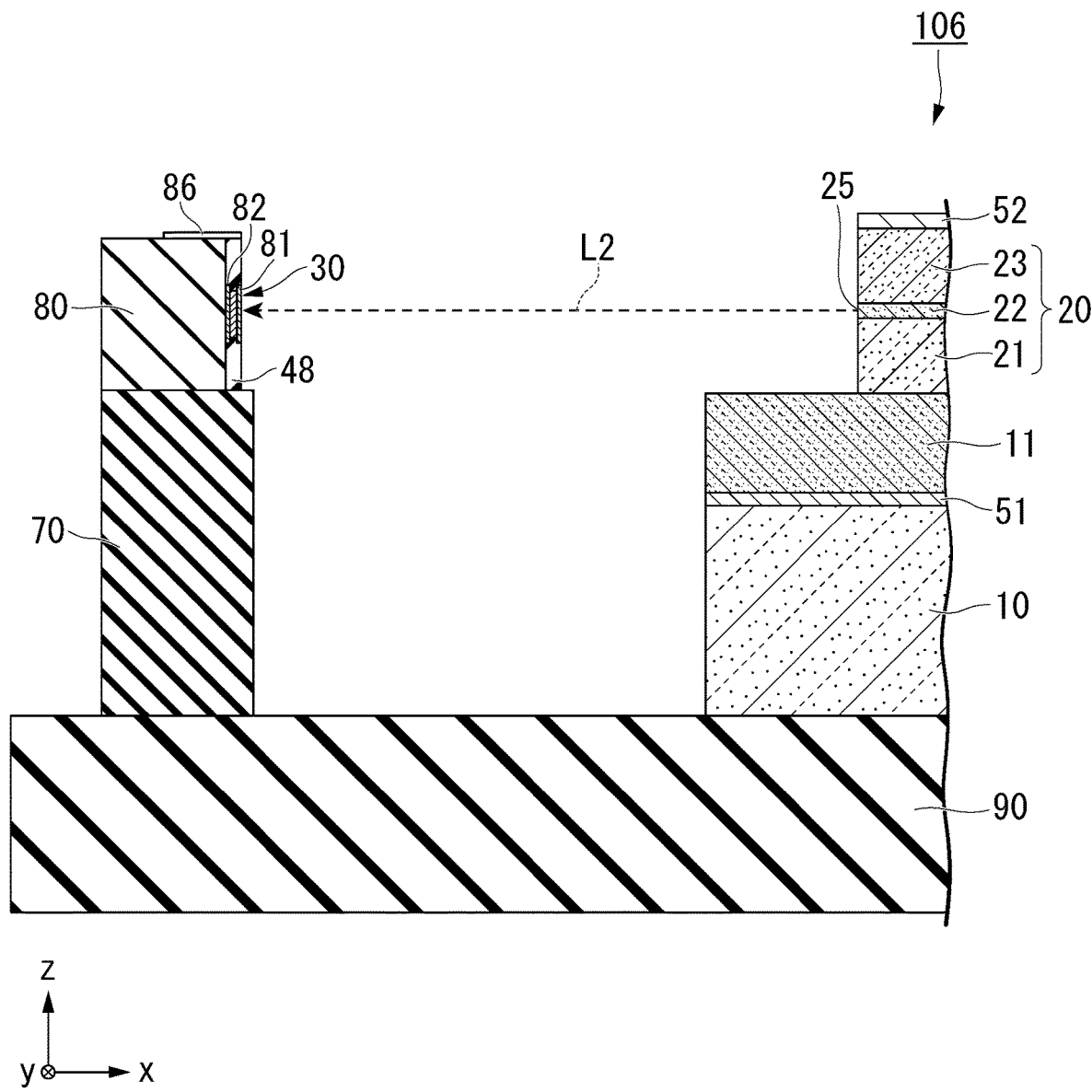
FIG. 17 is a cross-sectional view of a characteristic portion of an optical device according to a seventh embodiment.

FIG. 17 is a cross-sectional view of a characteristic portion of an optical device 106 according to a seventh embodiment. In the seventh embodiment, components similar to those of the above-described embodiment are denoted by similar reference signs and description thereof will be omitted.

In the optical device 106, a substrate 10 that supports a laser diode 20 and a support body 70 that supports a magnetic element 30 are different members. The laser diode 20 is on or above the substrate 10. The magnetic element 30 is on or above the support body 70.

The magnetic element 30 is formed on a support body 80. The support body 80 is made of, for example, a material similar to that of the support body 70. The support body 80 is arranged on the support body 70 such that the side surface of the support body 80 at the time of forming the magnetic element 30 on the support body 80 and the upper surface of the support body 70 face each other.

Figure 18:
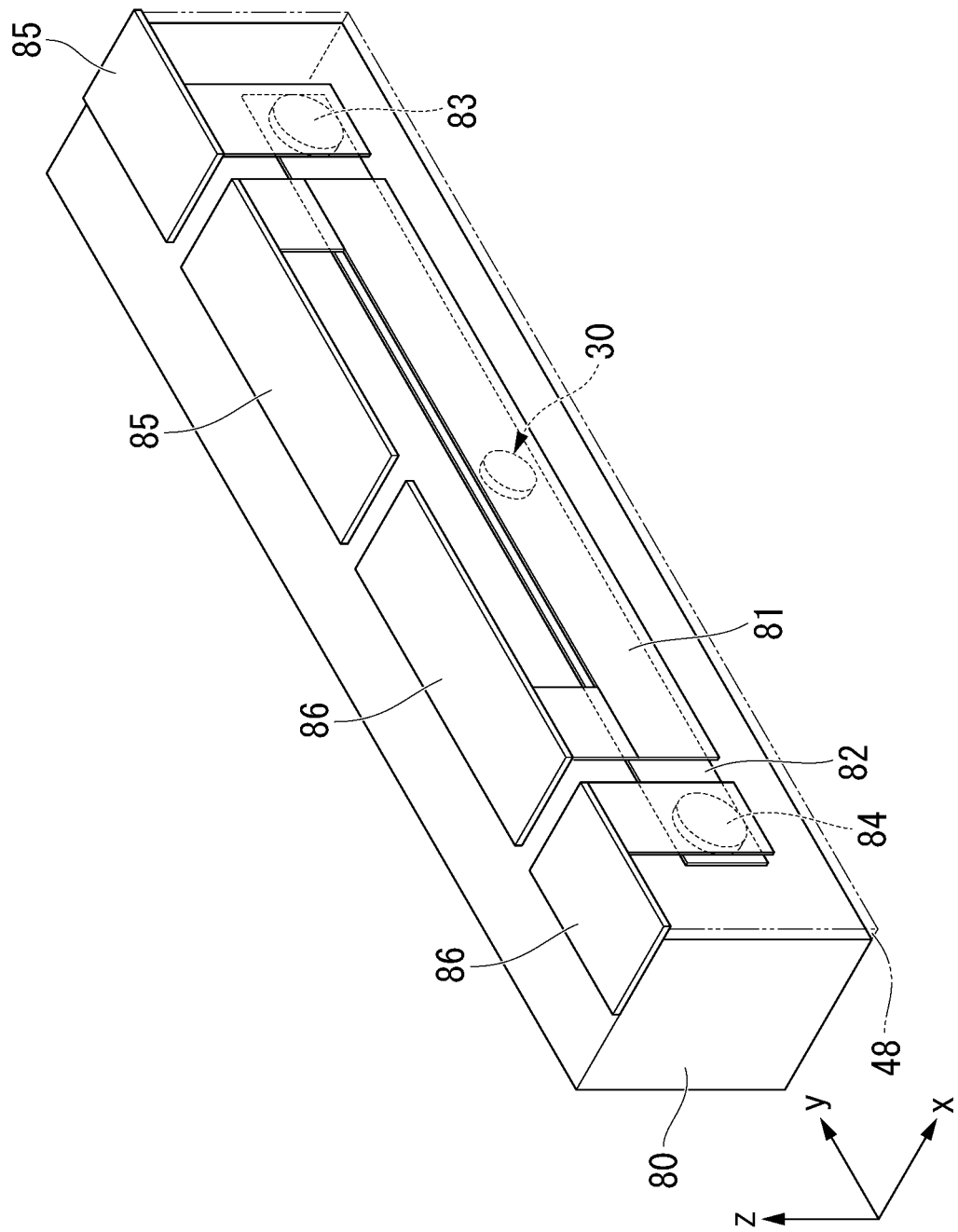
FIG. 18 is a perspective view of the vicinity of a magnetic element of the optical device according to the seventh embodiment.

FIG. 18 is a perspective view of the vicinity of the magnetic element 30 of the optical device 106 according to the seventh embodiment. The magnetic element 30 is sandwiched between an electrode 81 and an electrode 82. The electrode 81 is connected to a first terminal 85 and a second terminal 86. The electrode 82 is connected to the first terminal 85 via a via wiring 83. Also, the electrode 82 is connected to the second terminal 86 via a via wiring 84. The first terminal 85 and the second terminal 86 are formed on the side surface of the support body 80.

In the example shown in FIG. 17, a traveling direction of the light L2 emitted from the second emission portion 25 of the laser diode 20 coincides with a lamination direction of the magnetic element 30. For example, a height position of the magnetic element 30 in the z-direction coincides with a height position of the second emission portion 25 of the laser diode 20 in the z-direction. For example, the light L2 is applied to the magnetic element 30 from the lamination direction of the magnetic element 30. In this case, the electrode 81 has transparency with respect to a wavelength range of the light L2 applied to the magnetic element 30. When the electrode 81 transmits a part of the light L2, light is applied to the magnetic element 30.

The optical device 106 according to the seventh embodiment can monitor a change in an intensity of at least a part of the light (at least a part of the light L2) emitted from the laser diode 20 using the magnetic element 30. That is, the optical device 106 can monitor the change in the intensity of the light L1 externally emitted from the laser diode 20.

The optical device according to the above-described embodiment can provide new breakthroughs in the development of optical devices.

While embodiments of the invention have been described and illustrated above, it should be understood that these are exemplary of the invention and are not to be considered as limiting. Additions, omissions, substitutions, and other modifications can be made without departing from the spirit or scope of the disclosure. Accordingly, the invention is not to be considered as being limited by the foregoing description, and is only limited by the scope of the appended claims.

Explanation of References

10 Substrate
11 Buffer layer
20 Laser diode
21 N-type clad layer
22 Active layer
23 P-type clad layer
24 First emission portion
25 Second emission portion
30 Magnetic element
31 First ferromagnetic layer
32 Second ferromagnetic layer
33 Spacer layer
41, 42, 51, 52, 81, 82 Electrode
43, 44, 83, 84 Via wiring
45, 85 First terminal
46, 86 Second terminal
48, 61 Insulating layer
60 Reflector
70, 80 Support body
100, 101, 102, 103, 104, 105, 106 Optical device
110 Cap
120 Stem
130 Cover glass
140 Adhesive portion
150 Lead
200 Package
L1, L2 Light

What is claimed is:

1. An optical device comprising:
   a magnetic element including a first ferromagnetic layer, a second ferromagnetic layer, and a spacer layer sandwiched between the first ferromagnetic layer and the second ferromagnetic layer; and
   a laser diode,
   wherein at least a part of light emitted from the laser diode is applied to the magnetic element.

2. The optical device according to claim 1,
   wherein the laser diode includes a first emission portion and a second emission portion, and
   wherein at least a part of light emitted from the first emission portion or the second emission portion is applied to the magnetic element.

3. The optical device according to claim 1, further comprising a substrate,
   wherein the magnetic element and the laser diode are on or above the substrate.

4. The optical device according to claim 1, further comprising a substrate and a support body,
   wherein the substrate and the support body are different members,
   the laser diode is on or above the substrate, and
   the magnetic element is on or above the support body.

5. The optical device according to claim 1, further comprising a reflector,
   wherein the reflector reflects the at least a part of the light emitted from the laser diode toward the magnetic element.

6. The optical device according to claim 1,
   wherein the at least a part of the light emitted from the laser diode is applied to the magnetic element from a direction intersecting a lamination direction of the magnetic element.

7. The optical device according to claim 1,
   wherein the at least a part of the light emitted from the laser diode is applied to the magnetic element from a lamination direction of the magnetic element.

8. The optical device according to claim 2, further comprising a substrate,
   wherein the magnetic element and the laser diode are on or above the substrate.

9. The optical device according to claim 2, further comprising a substrate and a support body,
   wherein the substrate and the support body are different members,
   the laser diode is on or above the substrate, and
   the magnetic element is on or above the support body.

10. The optical device according to claim 2, further comprising a reflector,
    wherein the reflector reflects the at least a part of the light emitted from the laser diode toward the magnetic element.

11. The optical device according to claim 3, further comprising a reflector,
    wherein the reflector reflects the at least a part of the light emitted from the laser diode toward the magnetic element.

12. The optical device according to claim 4, further comprising a reflector,
wherein the reflector reflects the at least a part of the light emitted from the laser diode toward the magnetic element.

13. The optical device according to claim 2,
wherein the at least a part of the light emitted from the laser diode is applied to the magnetic element from a direction intersecting a lamination direction of the magnetic element.

14. The optical device according to claim 3,
wherein the at least a part of the light emitted from the laser diode is applied to the magnetic element from a direction intersecting a lamination direction of the magnetic element.

15. The optical device according to claim 4,
wherein the at least a part of the light emitted from the laser diode is applied to the magnetic element from a direction intersecting a lamination direction of the magnetic element.

16. The optical device according to claim 5,
wherein the at least a part of the light emitted from the laser diode is applied to the magnetic element from a direction intersecting a lamination direction of the magnetic element.

17. The optical device according to claim 2,
wherein the at least a part of the light emitted from the laser diode is applied to the magnetic element from a lamination direction of the magnetic element.

18. The optical device according to claim 3,
wherein the at least a part of the light emitted from the laser diode is applied to the magnetic element from a lamination direction of the magnetic element.

19. The optical device according to claim 4,
wherein the at least a part of the light emitted from the laser diode is applied to the magnetic element from a lamination direction of the magnetic element.

20. The optical device according to claim 5,
wherein the at least a part of the light emitted from the laser diode is applied to the magnetic element from a lamination direction of the magnetic element.

* * * * *